(12) United States Patent
Ohtani

(10) Patent No.: US 7,577,660 B2
(45) Date of Patent: Aug. 18, 2009

(54) TERMINAL DEVICE, INFORMATION PROCESSING APPARATUS, INFORMATION PROCESSING METHOD, INFORMATION PROCESSING PROGRAM AND RECORDING MEDIUM

(75) Inventor: Yohko Ohtani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 11/077,282

(22) Filed: Mar. 11, 2005

(65) Prior Publication Data

US 2005/0234944 A1    Oct. 20, 2005

(30) Foreign Application Priority Data

Mar. 16, 2004    (JP)    ............................. 2004-074960

(51) Int. Cl.
    *G06F 7/00*    (2006.01)
(52) U.S. Cl. ......................................... 707/9
(58) Field of Classification Search .................... 707/1, 707/9
    See application file for complete search history.

(56) References Cited

U.S. PATENT DOCUMENTS

| 2002/0105677 | A1* | 8/2002 | Sato ........................... 358/1.15 |
| 2003/0002068 | A1* | 1/2003 | Constantin et al. .......... 358/1.15 |
| 2003/0078934 | A1* | 4/2003 | Cappellucci et al. ........ 707/101 |
| 2004/0212823 | A1* | 10/2004 | Chavers et al. .............. 358/1.15 |
| 2005/0128527 | A1* | 6/2005 | Brawn et al. ................. 358/401 |

FOREIGN PATENT DOCUMENTS

JP    2002-84383    3/2002

* cited by examiner

*Primary Examiner*—Charles Rones
*Assistant Examiner*—Fazlul Quader
(74) *Attorney, Agent, or Firm*—Oblon, Spivak, McClelland, Maier & Neustadt, P.C.

(57) ABSTRACT

A terminal device is provided that serves as a terminal of an information processing apparatus that is a client of a user information managing server that manages user information in the form of item values of user information management items. This terminal device includes a group setting screen providing unit that provides a group setting screen for setting a group in the information processing apparatus. The group is specified by whether the user information of a user satisfies the condition that a predetermined item value is stored in a predetermined user information management item. The user information managing server manages whether the user belongs to the group.

22 Claims, 33 Drawing Sheets

FIG.5

| ENTRY ID | NAME | DISPLAY NAME | PRONUNCIATION | MAIL ADDRESS | FAX NUMBER | ... | USER CODE |
|---|---|---|---|---|---|---|---|
| 1 | TARO SUZUKI (IN CHINESE CHARACTERS) | SUZUKI | TARO SUZUKI | taro@r.co.jp | 03-5555-1111 | ....... | 12333 |
| 2 | JIRO SATO (IN CHINESE CHARACTERS) | SATO | JIRO SATO | jiro@r.co.jp | 03-5555-2222 | ....... | 13001 |
| 3 | HANAKO YAMAMOTO | YAMAMOTO | HANAKO YAMAMOTO | hanako@r.co.jp | 03-5555-3333 | ....... | 14245 |
| ....... | | | | | ....... | ....... | ....... |

FIG.11

```
dn:cn=TARO SUZUKI (IN CHINESE CHARACTERS),ou=RESEARCH & DEVELOPMENT,o=RICOH,c=JAPAN
objectClass:top
objectClass:country
objectClass:organization
objectClass:organizationUnit
objectClass:person
objectClass:organizationalPerson
objectClass:inetOrgPerson
c:JAPAN
o:RICOH
ou:RESEARCH & DEVELOPMENT
cn:TARO SUZUKI
sn:SUZUKI
givenName:TARO
cn;phonetic:TARO SUZUKI
mail:taro@r.co.jp
mail:tarosuzuki@r.co.jp
facsimileTelephoneNumber:03-5555-1111
userPassword:MTEwX2xkYXBfZW50cnlfMTEw
```

FIG.27

GROUP SET — 803Ia

| ADD | EDIT | RELATE | MEMBER REFERENCE | COPY | DELETE | MOVE |

SELECT THE GROUP WITH WHICH A RELATION IS TO BE ESTABLISHED OR CANCELED, AND PRESS "OK".
ESTABLISH A RELATION BETWEEN THE GROUPS OF TWO NEIGHBORING CLASSES (NOT IN THE SAME CLASS).

- CLASS 0 | CLASS 1 | CLASS 2 | CLASS 3
- ALL MEMBERS → RICOH
- PF DEVELOPMENT GROUP
- C&F DEVELOPMENT GROUP
- UCS TEAM
- EXECUTIVE GROUP
- GENERAL EMPLOYEE GROUP

OK | CANCEL | △ ◁ ▷ ▽ | CLOSE | SET

---

GROUP SET — 803Ib (same layout as above)

---

GROUP SET — 803Ic (same layout; RICOH → PF DEVELOPMENT GROUP and C&F DEVELOPMENT GROUP relations shown)

FIG.28

GROUP SET

[ADD] [EDIT] [RELATE] [MEMBER REFERENCE] [COPY] [DELETE] [MOVE]
SELECT THE GROUP OR CLASS TO BE DELETED, AND PRESS "OK".

| CLASS 0 | CLASS 1 | CLASS 2 | CLASS 3 |
|---|---|---|---|
| ALL MEMBERS → | RICOH → | PF DEVELOPMENT GROUP | UCS TEAM |
| | | C&F DEVELOPMENT GROUP | EXECUTIVE GROUP |
| | | | GENERAL EMPLOYEE GROUP |

[OK] [CANCEL] [△ ◁ ▷ ▽] [CLOSE] [SET]

803Ja

---

GROUP SET

[ADD] [EDIT] [RELATE] [MEMBER REFERENCE] [COPY] [DELETE] [MOVE]
SELECT THE GROUP OR CLASS TO BE DELETED, AND PRESS "OK".

| CLASS 0 | CLASS 1 | CLASS 2 | CLASS 3 |
|---|---|---|---|
| ALL MEMBERS → | RICOH → | PF DEVELOPMENT GROUP | UCS TEAM |
| | | C&F DEVELOPMENT GROUP | EXECUTIVE GROUP |
| | | | GENERAL EMPLOYEE GROUP |

[OK] [CANCEL] [△ ◁ ▷ ▽] [CLOSE] [SET]

803Jb

---

GROUP SET

[ADD] [EDIT] [RELATE] [MEMBER REFERENCE] [COPY] [DELETE] [MOVE]
SELECT THE GROUP OR CLASS TO BE DELETED, AND PRESS "OK".

| CLASS 0 | CLASS 1 | CLASS 2 | CLASS 3 |
|---|---|---|---|
| ALL MEMBERS → | RICOH → | C&F DEVELOPMENT GROUP | UCS TEAM |
| | | | EXECUTIVE GROUP |
| | | | GENERAL EMPLOYEE GROUP |

[OK] [CANCEL] [△ ◁ ▷ ▽] [CLOSE] [SET]

```
<GROUP SETTING INFORMATION>
    <GROUP INFORMATION>
        <NAME>RICOH
        <ID>1
        <CONDITION>(o=RICOH)
        <NUMBER OF UPPER-CLASS GROUPS>0
    </GROUP INFORMATION>
    <GROUP INFORMATION>
        <NAME>PF DEVELOPMENT GROUP
        <ID>2
        <CONDITION>(ou=PF)
        <NUMBER OF UPPER-CLASS GROUPS>1
        <UPPER-CLASS GROUP ID>1
    </GROUP INFORMATION>
    <GROUP INFORMATION>
        <NAME>C&F DEVELOPMENT GROUP
        <ID>3
        <CONDITION>(ou=C&F)
        <NUMBER OF UPPER-CLASS GROUPS>1
        <UPPER-CLASS GROUP ID>1
    </GROUP INFORMATION>
    .....
</GROUP SETTING INFORMATION>
```

TERMINAL DEVICE, INFORMATION PROCESSING APPARATUS, INFORMATION PROCESSING METHOD, INFORMATION PROCESSING PROGRAM AND RECORDING MEDIUM

BACKGROUND OF THE INVENTION

1. Field of the Invention

The present invention relates to a terminal device such as a personal computer, an information processing apparatus such as an information device that has an information processing function as a principal function and an electric device that has an information processing function as a sub function, an information processing method, an information processing program, and a recording medium such as a CD-ROM. Specific examples of information devices having an information processing function as a principal function include personal computers. Specific examples of electric devices having an information processing function as a sub function include image forming apparatuses such as copying machines, printers, scanners, facsimile machines, compound machine, and combination machines that have dramatically improved the information processing functions in recent years.

2. Description of the Related Art

Recently, compound machines and combination machines each having the functions of a copying machine, a printer, a scanner, and a facsimile machine have been on the market. Each of those compound machines and combination machines has hardware units such as an image pickup unit, a printer unit, a communication unit, and an operation display unit, and four software units that are equivalent to a copying machine, a printer, a scanner, and a facsimile machine. By switching the software units, each of the compound machines and combination machines functions as a copying machine, a printer, a scanner, or a facsimile machine. When functioning as a copying machine or a printer, each of the compound machines and combination machines prints an image on a printing paper sheet or the like. When functioning as a copying machine or a scanner, each of the compound machines and combination machines reads the image of an original document or the like. When functioning as a facsimile machine, each of the compound machines and combination machines exchanges images with another device via a telephone line or the like.

Among the functions of the compound machines and combination machines, there are functions that require "user information". For example, when a compound machine or a combination machine functions as a scanner or a facsimile machine, "user information" such as a mail address and a facsimile number. A compound machine or a combination machine normally has a function of managing the user information. It is more preferable for a compound machine or a combination machine to have a function of acquiring the user information from "user information managing servers" that manage the user information. Specific examples of the "user information managing servers" include LDAP (Lightweight Directory Access Protocol) servers.

In the LDAP, people and organizations are regarded as "objects". The information as to each object is stored and managed under the "entry" of the object. Under the "entry", an "object class" that is the information as to the type of the object, and the "attributes" that are the information as to the characteristics of the object are stored. The attributes include "attribute types" such as c (country), o (organization), ou (organization unit), cn (full name), sn (surname), givenName (first name), mail (mail address), facsimileTelephoneNumber (facsimile number), and "attribute values" such as c=Japan, o=Ricoh, ou=research & development, cn=Taro Suzuki, sn=Suzuki, and givenName=Taro. Since the entries are classified under the object classes, the identification name (DN) of each entry is formed by arranging the relative identification name (RDN) of the entry that derives from one attribute (identification attribute) of the entry in the hierarchical order.

Various requests and responses are exchanged between a LDAP client and a LDAP server. In the LDAP, authorizing operations such as "bind" and "unbind", inquiring operations such as "search" and "compare", and updating operations such as "add", "delete", and "modify", are prepared. For example, when a request for a searching operation is transmitted from a LDAP client to a LDAP server, search results are supplied from the LDAP server to the LDAP client.

As the information processing function of each compound machine or combination machine has dramatically improved, more and more compound machines and combination machines perform usage restricting operations to restrict the rights of users to use the compound machine and combination machines. When a usage restricting operation is performed to restrict the rights of users to use a compound machine or a combination machine, it is more convenient to allow the users of a group A to use a function A, and allow the users of a group B to use a function B, than to allow a user A to use the function A and allow a user B to use the function B. In other words, it is more convenient to set usage restrictions on each group rather than on each user. To realize this, however, it is necessary to prepare the means to set the groups of users to use the compound machine or combination machine.

SUMMARY OF THE INVENTION

A general object of the present invention is to provide a terminal device, an information processing apparatus, an information processing method, an information processing program, and a recording medium in which the above disadvantages are eliminated.

A more specific object of the present invention is to provide a technique of setting groups of users to use an information processing apparatus such as an image forming apparatus.

The above objects of the present invention are achieved by a terminal device that serves as a terminal of an information processing apparatus that is a client of a user information managing server that manages user information in the form of item values of user information management items. This terminal device includes a group setting screen providing unit that provides a group setting screen for setting a group in the information processing apparatus. The group is specified by whether the user information of a user satisfies the condition that a predetermined item value is stored in a predetermined user information management item. The user information managing server manages whether the user belongs to the group.

With this terminal device, the group of users whose user information is managed by the user information managing server can be set in the information processing apparatus.

This terminal device further includes an authorization setting screen providing unit that provides an authorization setting screen for setting conditions for causing the user information managing server to authorize a user to use the information processing apparatus. The conditions are set in the information processing apparatus.

With this terminal device, the conditions for causing the user information managing server to authorize a user to use the information processing apparatus can be set in the information processing apparatus.

This terminal device further includes a usage restriction setting screen providing unit that provides a usage restriction setting screen for setting conditions for putting usage restrictions on users to use the information processing apparatus for each group. The conditions are set in the information processing apparatus.

With this terminal device, the conditions for putting usage restrictions on the users of each "group" to use the information processing apparatus can be set in the information processing apparatus.

In this terminal device, the group setting screen providing unit provides such a group setting screen as to set the conditions through a character inputting operation.

With this terminal device, the condition setting operation can be performed through a character inputting operation.

In this terminal device, the group setting screen providing unit provides such a group setting screen as to set the conditions through a user information management item selecting operation and an item value selecting operation.

With this terminal device, the conditions can be readily set, as the condition setting operation can be performed through the "user information management item" selecting operation and the "item value" selecting operation.

In this terminal device, the group setting screen providing unit provides such a group setting screen as to set the conditions through a user information management item selecting operation, an item value selecting operation, and an "AND, OR, NOT" selecting operation.

With this terminal device, the conditions involving "AND", "OR", and "NOT" can be readily set, as the condition setting operation can be performed through the "user information management item" selecting operation, the "item value" selecting operation, and the "AND, OR, NOT" selecting operation.

In this terminal device, the group setting screen providing unit provides such a group setting screen as to set the group by handling an icon that represents the group.

As the group can be handled by dragging the icon representing the group in this terminal device, the handling of the group can be easily sensed, especially visually.

In this terminal device, a combining operation can be performed to combine a plurality of groups into one group on the group setting screen or the usage restriction setting screen.

In this terminal device, a dividing operation can be performed to divide one group into a plurality of groups on the group setting screen or the usage restriction setting screen.

In this terminal device, a referring operation can be performed to refer to a user who belongs to the group on the group setting screen or the usage restriction setting screen.

In this terminal device, a copying operation can be performed to copy a group on the group setting screen or the usage restriction setting screen.

In this terminal device, a deleting operation can be performed to delete a group on the group setting screen or the usage restriction setting screen.

In this terminal device, the group is written in XML and is set by SOAP in the information processing apparatus.

In this terminal device, the user information managing server is a LDAP server.

In this terminal device, the information processing apparatus is an image forming apparatus.

The above objects of the present invention are also achieved by an information processing method that is utilized by a terminal device serving as a terminal of an information processing apparatus that is a client of a user information managing server that manages user information as the item values of user information management items. This information processing method includes the step of providing a group setting screen for setting a group in the information processing apparatus. The group is specified by whether the user information of a user satisfies the condition that a predetermined item value is stored in a predetermined user information management item. The user information managing server manages whether the user belongs to the group.

By this information processing method, the group of users whose user information is managed by the user information managing server can be set in the information processing apparatus.

This information processing method further includes the step of providing an authorization setting screen for setting conditions for causing the user information managing server to authorize a user to use the information processing apparatus. The conditions are set in the information processing apparatus.

By this method, the conditions for causing the user information managing server to authorize a user to use the information processing apparatus can be set in the information processing apparatus.

This information processing method further includes the step of providing a usage restriction setting screen for setting conditions for putting usage restrictions on users to use the information processing apparatus for each group. The conditions are set in the information processing apparatus.

By this method, the conditions for putting usage restrictions on the users of each "group" to use the information processing apparatus can be set in the information processing apparatus.

The above objects of the present invention are also achieved by an information processing program that causes a computer to perform an operation by the above information processing method.

The above objects of the present invention are also achieved by a recording medium on which an information processing program is recorded. The information processing program causes a computer to perform an operation by the above information processing method.

The above objects of the present invention are also achieved by an information processing apparatus that is a client of a user information managing server that manages user information in the form of item values of user information management items. A group is set in the information processing apparatus by a terminal of the information processing apparatus. The group is specified by whether user information of a user satisfies the condition that a predetermined item value is stored in a predetermined user information management item. The user information managing server manages whether the user belongs to the group.

In this information processing apparatus, conditions for causing the user information managing server to authorize a user to use the information processing apparatus can be set in the information processing apparatus by the terminal of the information processing apparatus.

In this information processing apparatus, conditions for putting usage restrictions on users to use the information processing apparatus for each group can be set in the information processing apparatus by the terminal of the information processing apparatus.

The above and other objects, features, and advantages of the present invention will become more apparent from the following detailed description taken in conjunction with the accompanying drawings.

BRIEF DESCRIPTION OF THE DRAWINGS

FIG. 5 illustrates an address book;

FIG. 11 illustrates the user information that is acquired from the LDAP servers;

FIG. 27 is a screen transition chart with respect to a relation establishing operation;

FIG. 28 is a screen transition chart with respect to a deleting operation;

FIG. 31 shows XML data for the groups that are set through the group setting screen of FIG. 25;

DESCRIPTION OF THE PREFERRED EMBODIMENTS

The following is a description of embodiments of the present invention, with reference to the accompanying drawings.

Figure 37:
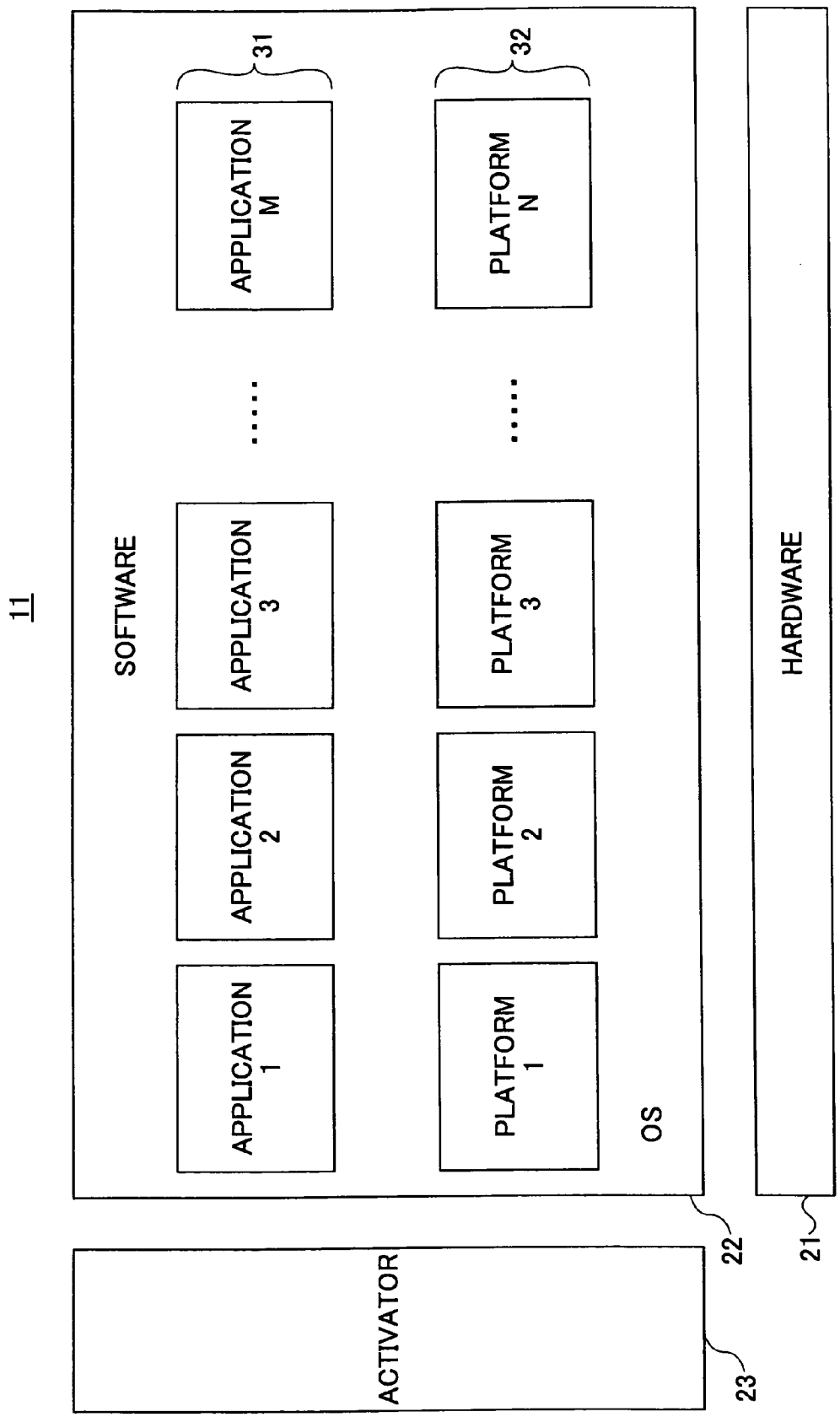
FIG. 37 illustrates an information processing apparatus as an embodiment of the present invention.

FIG. 37 illustrates an information processing apparatus 11 that is en embodiment of the present invention. The information processing apparatus 11 includes hardware 21 of various types, software 22 of various types 22, and an activator 23.

The hardware 21 of the information processing apparatus 11 includes an information processing unit that is formed with a CPU, a ROM, a RAM, and a HDD, a communication unit that is formed with a MODEM and a NIC, and an operation display unit that is formed with a keyboard, a mouse, and a display.

The software 22 of the information processing apparatus 11 includes applications 31 of various types and platforms 32 of various types. The platforms 32 include a module for controlling the information processing unit, a module for performing mediation for the communication unit, a module for controlling the operation display unit, a module for controlling the management of user information, and a module for controlling the management of the system. These programs are executed in parallel by the UNIX (registered tradename) operating system (OS) or the like, process by process.

The activator 23 is first activated when power is supplied to the information processing apparatus 11. As a result, the UNIX (tradename) OS or the like is activated, and the applications 31 and the platforms 32 are activated. These programs are accumulated on the HDD or a memory card, and are reproduced from the HDD or the memory card for execution by the RAM.

The information processing apparatus 11 shown in FIG. 37 may be an information device that has information processing functions as principal functions, or an electric device that has information processing functions as secondary functions. Specific examples of the information device having information processing functions as principal functions include personal computers. Specific examples of the electric device include information forming apparatuses such as copying machines, printers, scanners, facsimile machines, compound machines, and combination machines that have been dramatically improved in the information processing fields recently. In the following, a combination machine 101 that is a specific example of the information processing apparatus 11 is described.

Figure 1:
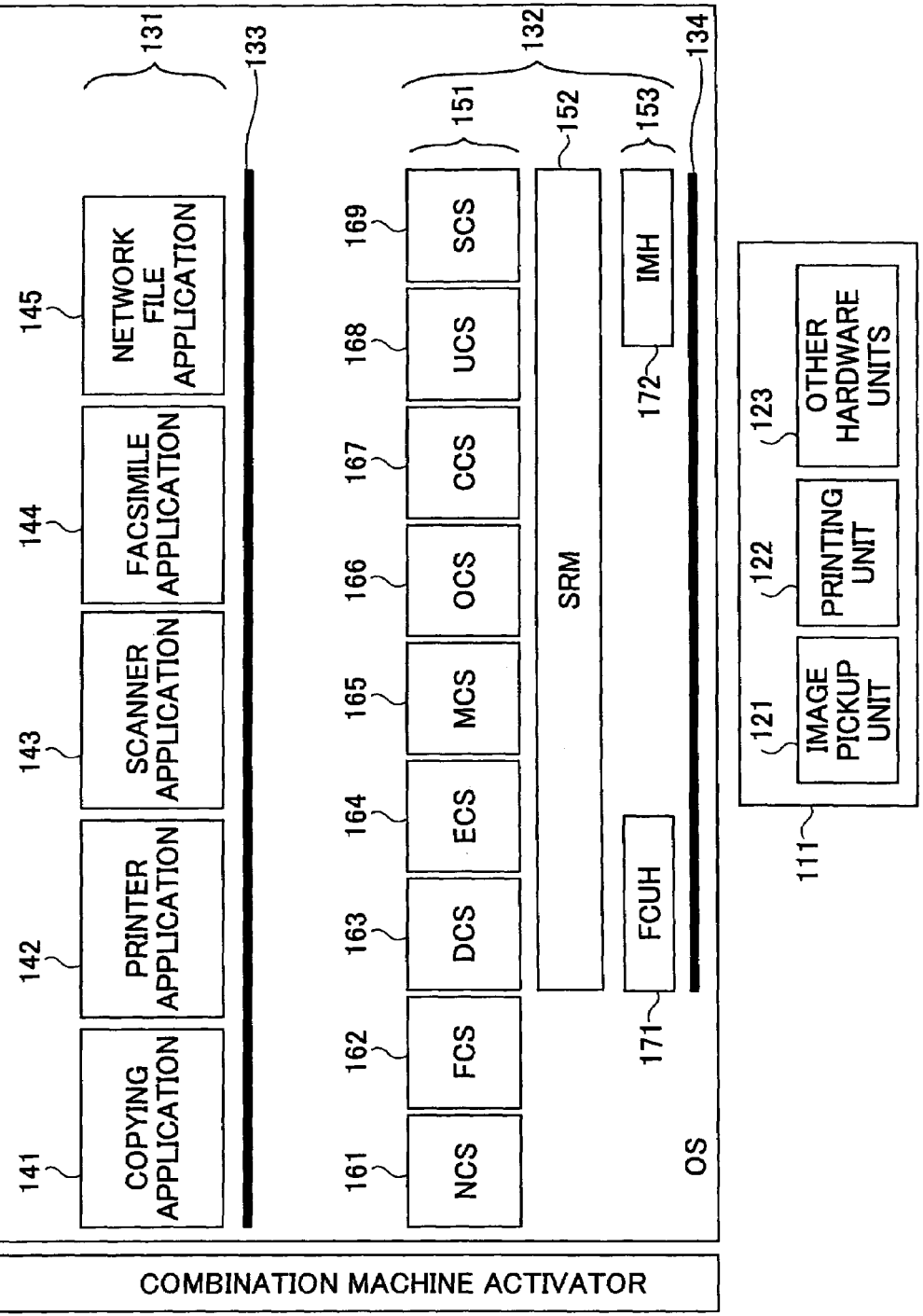
FIG. 1 illustrates a combination machine that is an embodiment of the present invention.

FIG. 1 illustrates the combination machine 101 that is an embodiment of the present invention. The combination machine 101 shown FIG. 1 includes hardware 111 of various types, software 112 of various types, and a combination machine activator 113. The combination machine 101 shown in FIG. 1 can function as a copying machine, a printer, a scanner, or a facsimile machine.

The hardware 111 of the combination machine 101 includes an image pickup unit 121, a printing unit 122, and other hardware units 123.

The image pickup unit 121 is to read an image (image data) from an original, and is to be used when the combination machine 101 functions as a copying machine, a scanner, or a facsimile machine. The image pickup unit 121 may be a monochrome image pickup unit or a multicolor image pickup unit. The image pickup unit 121 has a document setting unit as a function for setting documents.

The printing unit 122 utilizes the electrophotography technique, and includes a photosensitive member, a charging unit, an exposing unit, a developing unit, a transferring unit, and a fixing unit. The printing unit 122 is equipped with a paper feeding unit, a paper discharging unit, and paper transporting unit as functions for transporting printing paper sheets.

The other hardware units 123 are described later, with reference to FIG. 2.

The software 112 of the multifunctional unit 101 includes various applications 131 and various platforms 132. These programs are executed in parallel by the UNIX (registered tradename) operating system (OS), process by process.

The applications 131 are software for performing inherent information processing operations of a copying machine, a printer, a scanner, and a facsimile machine. The applications 131 include a copying application 141, a printer application 142, a scanner application 143, a facsimile application 144, and a network file application 145. The network file application 145 is formed with a Web browser for reading HTML documents or the likes, and Web server software for distributing HTML documents or the likes.

The platforms 132 are software for performing information processing operations in response to processing requests from the applications 131. An application program interface (API) 133 is used to receive the processing requests from the applications 131, and an engine interface 134 is used to perform the requested operations. The platforms 132 include various control services 151, a system resource manager 152, and various handlers 153.

The control services 151 interpret the processing requests from the applications 131, and generates a request to obtain the hardware 111 in accordance with the interpretation results. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169.

The NCS 161 is to perform mediation for data communications via a network or the like. The FCS 162 is to provide an API to perform image data communications, image data reading operations, image data printing operations, or the likes, as a facsimile machine. The DCS 163 is to control the distribution of document data accumulated in the combination machine 101. The ECS 164 is to control the engines of the image pickup unit 121, the printing unit 122, or the like. The MCS 165 is to control memory and the hard disk drive for storing and processing image data. The OCS 166 is to control the operation panel. The CCS 167 is to control the authorizing process and charging process. The UCS 168 is to control the management of user information. The SCS 169 is to control the management of the system.

The system resource manager (SRM) 152 mediates the request for obtaining the hardware 111, and performs a control operation for responding to the request in accordance with the mediation results. More specifically, the SRM 152 determines whether the requested hardware 111 can be used (whether there is not another request for the hardware 111). If it can be used, the SRM 152 informs each of the control services 151 that the requested hardware 111 can be used. Further, the SRM 152 creates the usage schedule of the requested hardware 111, and performs a control operation for responding to the request in accordance with the schedule.

The handlers 153 manage the hardware 111 in accordance with the mediation results. The handlers 153 include a facsimile control unit handler (FCUH) 171 and an image memory handler (IMH) 172. The FCUH 171 manages the facsimile control unit. The IMH 172 allocates a memory to each service, and manages the memory allocated to each service.

The combination machine activator 113 is first activated when power is supplied to the combination machine 101. By doing so, the UNIX (registered tradename) OS or the like is activated, and the applications 131 and the platforms 132 are then activated. These programs are accumulated in the hard disk drive or memory cards, are reproduced from the hard disk drive or the memory cards, and are loaded into the memories.

Figure 2:
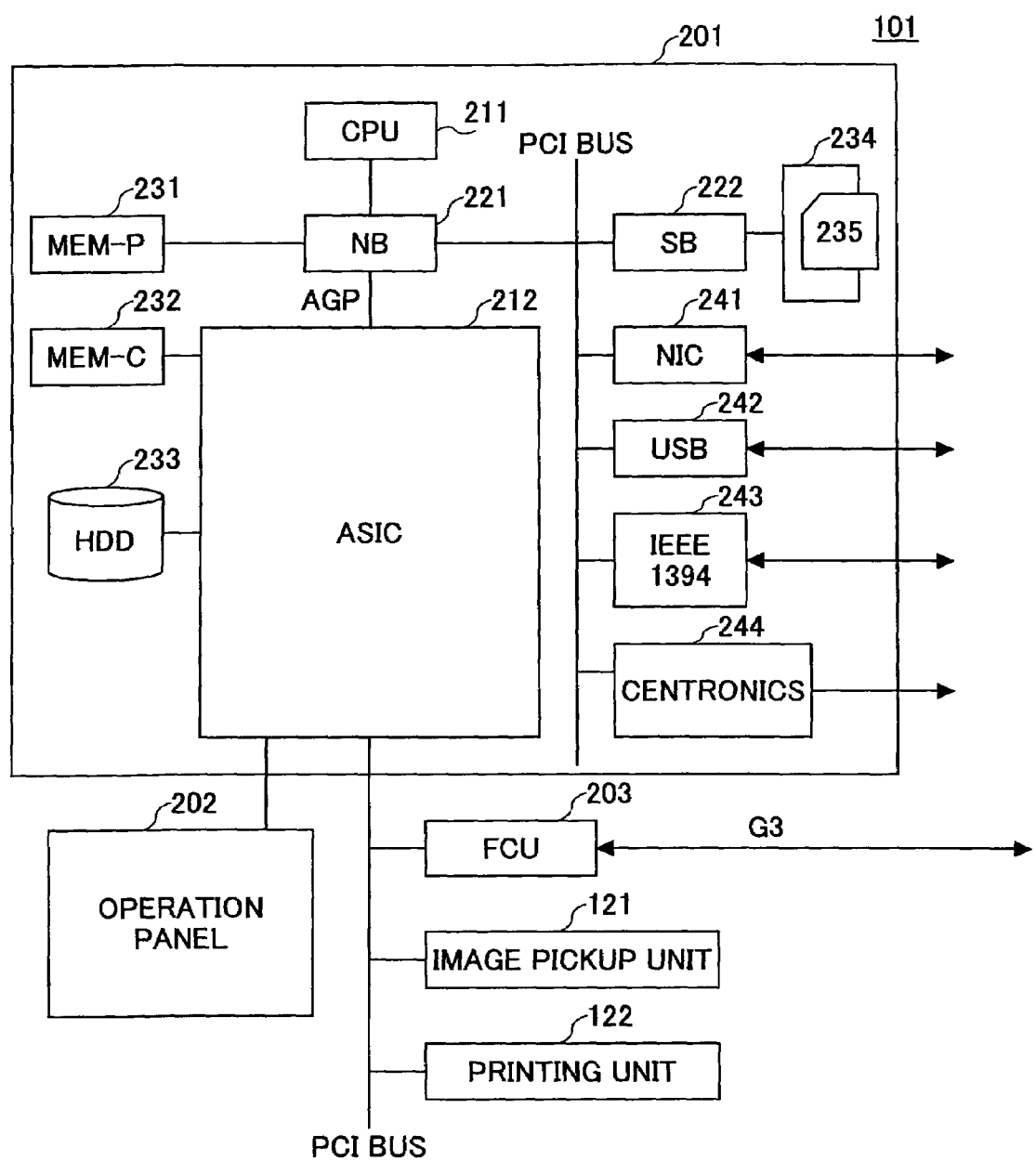
FIG. 2 shows the hardware structure of the combination machine of FIG. 1.

FIG. 2 illustrates the hardware structure of the combination machine 101 of FIG. 1. The hardware 111 of the combination machine 101 include a controller 201, an operation panel 202, a facsimile control unit (FCU) 203, the image pickup unit 121, and the printing unit 122. These components minus the image pickup unit 121 and the printing unit 122 are equivalent to the other hardware units 123 of FIG. 1.

The controller 201 includes a CPU 211, an ASIC 212, a NB (north bridge) 221, a SB (south bridge) 222, a MEM-P (system memory) 231, a MEM-C (local memory) 232, a HDD (hard disk drive) 233, a memory card slot 234, a NIC (network interface controller) 241, a USB device 242, an IEEE 1394 device 243, a Centronics device 244.

The CPU 211 is an IC for performing various information processing operations, and executes the applications 131 and the platforms 132 in parallel by the UNIX (registered tradename) OS or the like, process by process. The ASIC 212 is an IC for image processing. The NB 221 is a bridge for connecting the CPU 211 and the ASIC 212. The SB 222 is a bridge for connecting the NB 221 to a peripheral device or the like. The ASIC 212 and the NB 221 are connected to each other via an AGP (accelerated graphics port).

The MEM-P 231 is a memory that is connected to the NB 221. The MEM-C 232 is a memory that is connected to the ASIC 212. The HDD 233 is a storage that is connected to the ASIC 212, and is used to accumulate image data, document data, programs, font data, and form data. The memory card slot 234 is a slot that is connected to the SB 222. A memory card 235 is to be inserted into the memory card slot 234.

The NIC 241 is a controller for performing data communications utilizing a MAC address or the like over a network. The USB device 242 is a device to provide a serial port in compliance with the USB standard. The IEEE 1394 device 243 is a device to provide a serial port in compliance with the IEEE 1394 standard. The Centronics device 244 is a device to provide a parallel port in compliance with the Centronics standard. The NIC 241, the USB device 242, the IEEE 1394 device 243, and the Centronics device 244 are connected to the NB 221 and the SB 222 via a PCI (peripheral component interconnect) bus.

The operation panel 202 is the hardware (an operating unit) for an operator to perform inputs into the combination machine 101, as well as the hardware (a display unit) for the operator to obtain outputs from the combination machine 101. The operation panel 202 is connected to the ASIC 212. The FCU 203, the image pickup unit 121, and the printing unit 122 are connected to the ASIC 212 via a PCI (peripheral component interconnect) bus.

Figure 3:
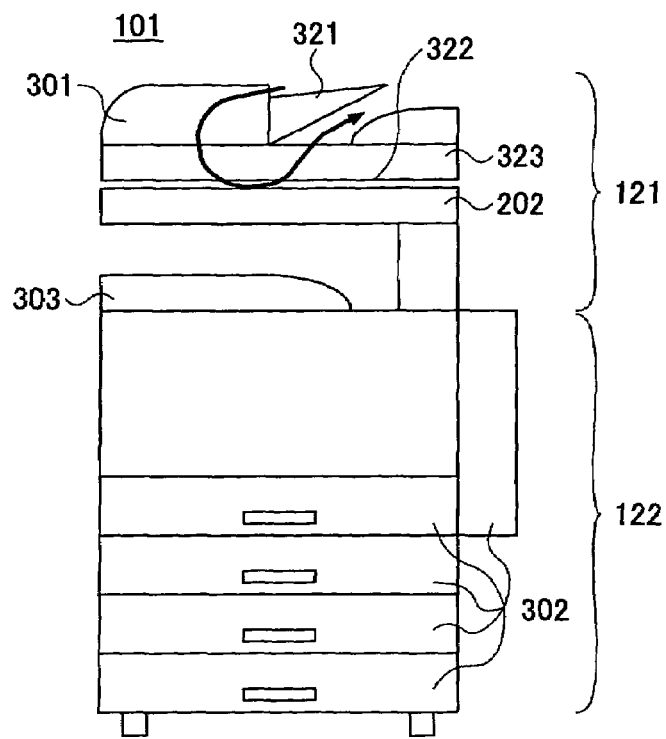
FIG. 3 is a sketch drawing of the combination machine of FIG. 1.

FIG. 3 is a sketch drawing of the combination machine 101 of FIG. 1. FIG. 3 shows the location of the image pickup unit 121, the location of the printing unit 122, and the location of the operation panel 202. FIG. 3 also shows a document setting unit 301 on which documents are set, a paper feeding unit 302 from which printing paper sheets are fed, and a sheet discharging unit 303 onto which printing paper sheets are discharged. The document setting unit 301 is a component of the image pickup unit 121, and the paper feeding unit 302 and the sheet discharging unit 303 are components of the printing unit 122.

Figure 4:
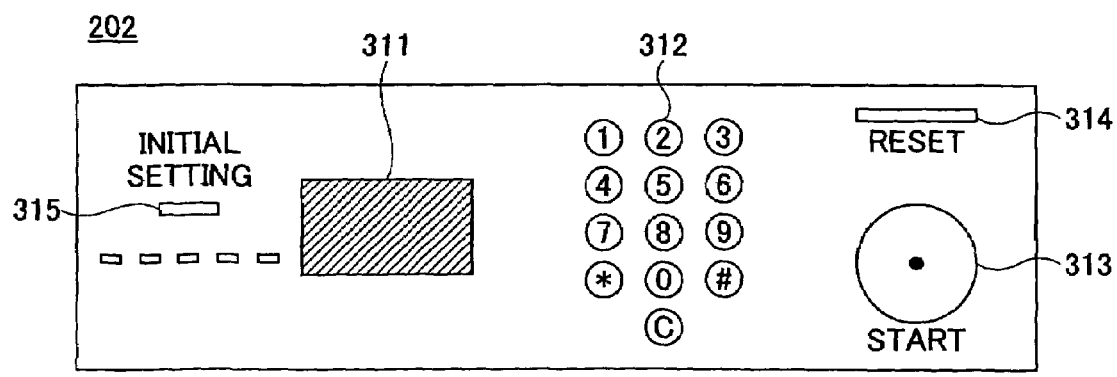
FIG. 4 illustrates an operation panel.

As shown in FIG. 4, the operation panel 202 includes a touch panel 311, a ten key unit 312, a start button 313, a reset button 314, and an initializing button 315.

The touch panel 311 is the hardware (a touch operating unit) for performing an inputting operation through a touching operation, as well as the hardware (an image display unit) for obtaining an output through image display. The ten key unit 312 is the hardware for performing a numeral inputting operation through a key pressing operation. The start button 313 is the hardware for starting a desired operation through a button pressing operation. The reset button 314 is the hardware for resetting the device through a button pressing operation. The initializing button 315 is the hardware for displaying the initial screen through a button pressing operation.

When an original document is set on the document setting unit 301 and the start button 313 is pressed, the combination machine 101 reads the image of the original document through the image pickup unit 121. When functioning as a copying machine, the combination machine 101 prints the image on a printing paper sheet through the printing unit 122. As a facsimile machine, the combination machine 101 transmits the image to another device via a telephone line or a network, using the FCU 203 and the NIC 241. Printing paper sheets are to be fed from the paper feeding unit 302, and are to be discharged onto the sheet discharging unit 303.

The document setting unit 301 includes an ADF (automatic document feeder) 321, a flat bed 322, and a flat bed cover 323. The paper feeding unit 302 is formed with four paper feeding trays and one manual paper feeding tray. The sheet discharging unit 303 is formed with one sheet discharging tray.

Two or more documents can be set on the ADF 321. When documents are set on the ADF 321 and the start button 313 is pressed, the combination machine 101 reads the images of the documents through the image pickup unit 121. More specifically, when two or more documents are set on the ADF 321 and the start button 313 is pressed, the ADF 321 transports the documents one by one through a path indicated by the arrow in FIG. 3. The image pickup unit 121 then reads the image of each document that is being transported through the path indicated by the arrow in FIG. 3.

A document is set on the flat bed 322 in a face-down manner. When a document is set on the flat bed 322 and the start button 313 is pressed, the combination machine 101 reads the image of the document by the image pickup unit 121. More specifically, when a document is set on the flat bed 322 in a face-down manner and the start button 313 is pressed, the image pickup unit 121 reads the image of the document that faces the image pickup unit 121 via the transparent flat bed 322.

(User Information)

Next, the user information of the combination machine 101 of FIG. 1 is described.

In the combination machine 101 of FIG. 1, user information is accumulated and managed on the HDD 233 or the like by the UCS 168. Also, the user information is used by the scanner application 143, the facsimile application 144, or the like. When the combination machine 101 functions as a scanner or a facsimile machine, user information such as email addresses and facsimile numbers is necessary. Using the user information that is managed by the UCS 168, the combination machine 101 performs an image forming operation (an operation as a copying machine, a scanner, or a facsimile machine) by transmitting an image to another device through a telephone line or a network.

In the combination machine 101 of FIG. 1, the user information is managed by the UCS 168 using an address book shown in FIG. 5. More specifically, a user (an entry) is managed with a user ID (an entry ID), and the user information is managed as items such as "name", "display name", "pronunciation", "mail address", "facsimile number", and the likes. The data structure of the user information of each user has the tree structure shown in FIG. 6. In the tree structure, main items include "name" and "display name", and sub items include "mail address" and "facsimile number". The user information of the user No. 1 is managed as one entry, but may be managed as two or more entries.

The combination machine 101 of FIG. 1 can acquire user information from a LDAP server through the UCS 168. The user information acquired from the LDAP server through the UCS 168 is accumulated and managed on the HDD 233 by the UCS 168. Here, the combination machine 101 is connected to three LDAP servers 401 (LDAP servers A, B, and C), and a network 411 such as a LAN. Thus, the user information can be obtained from the LDAP servers 401 via the network 411 such as a LAN.

Figure 7:
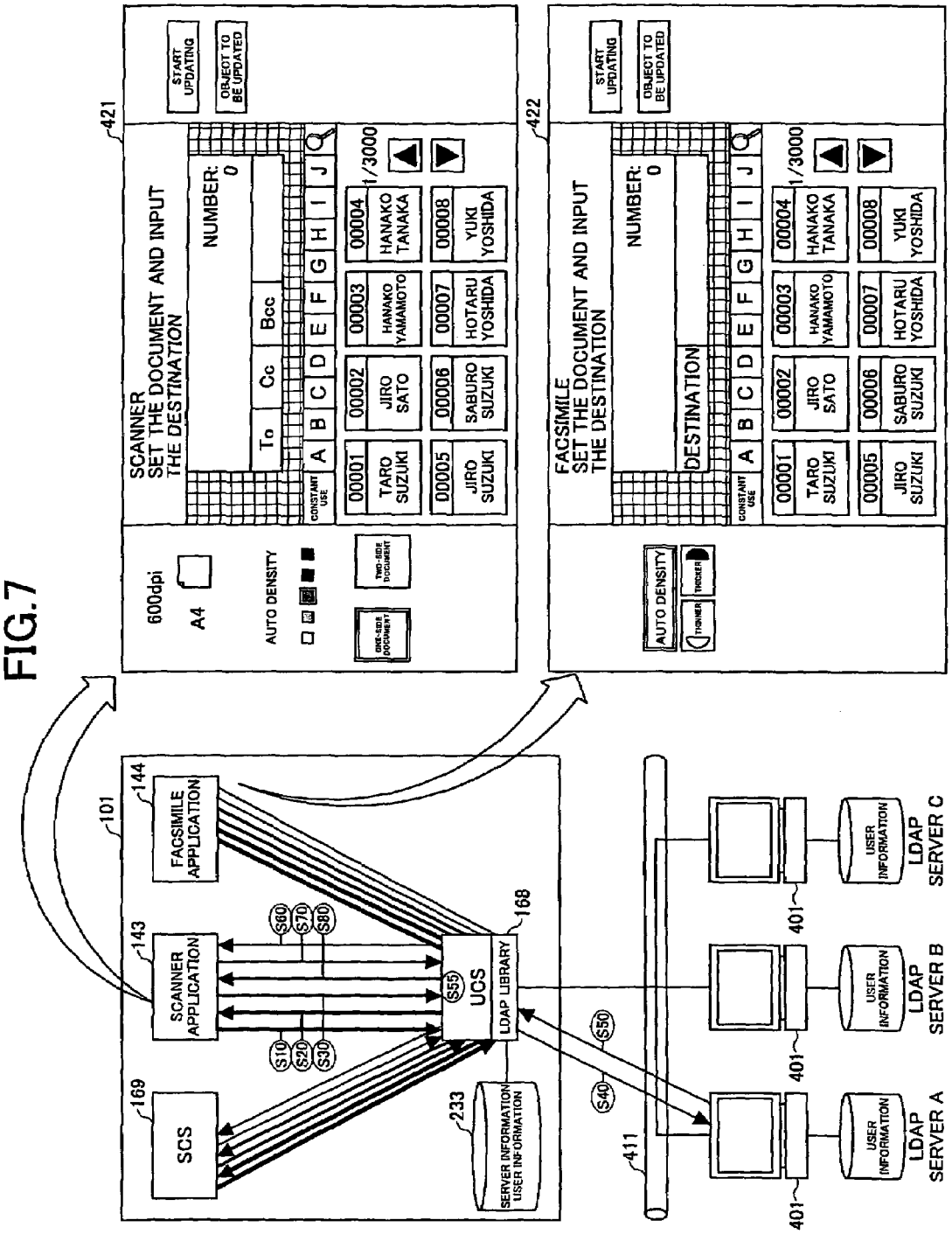
FIG. 7 shows the system structure illustrating a user information acquiring operation.
Figure 8:
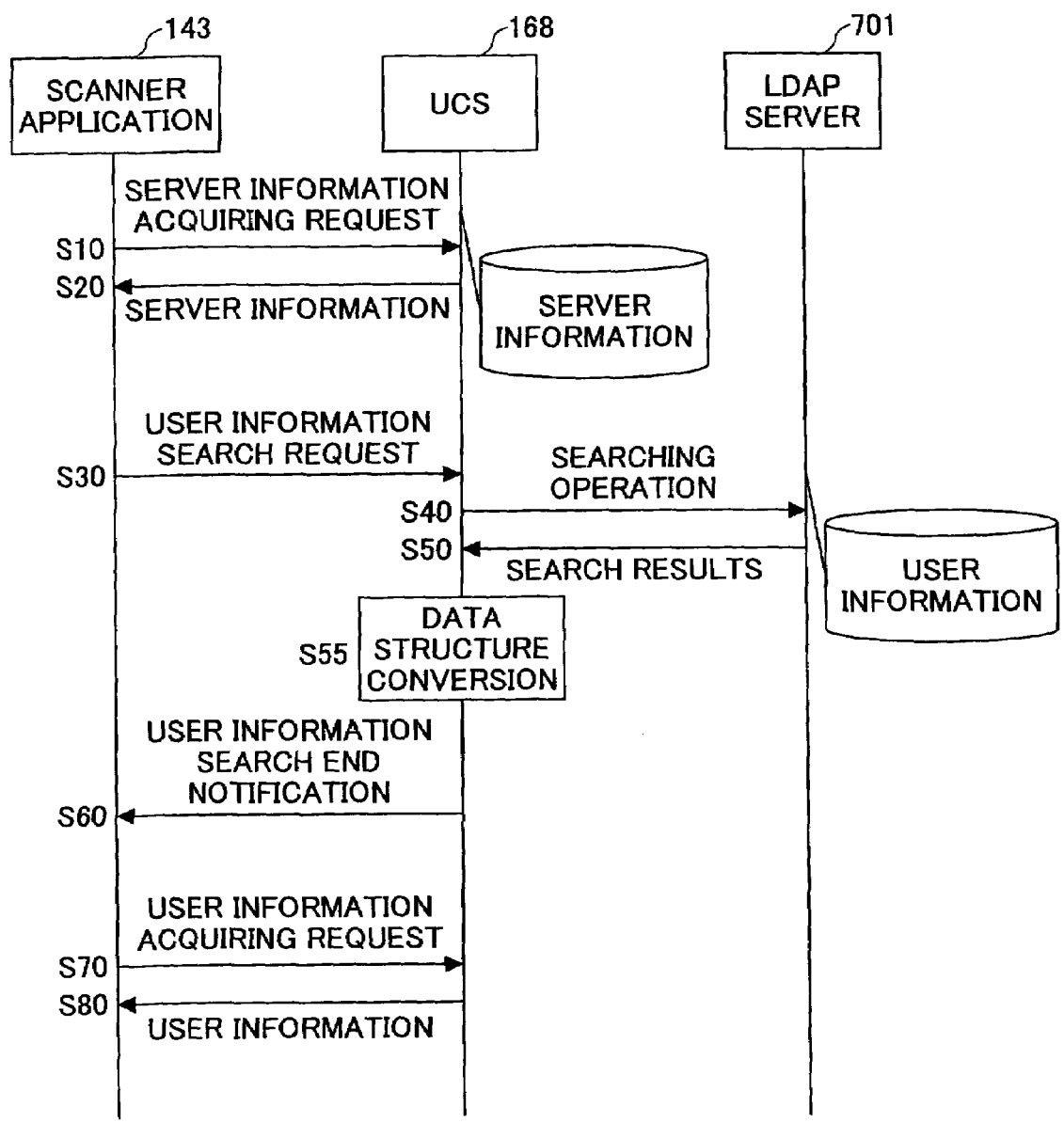
FIG. 8 is a sequence diagram illustrating the user information acquiring operation.

Referring to FIGS. 7 and 8, this operation is described. FIG. 7 illustrates the system structure for obtaining user information, and FIG. 8 is a sequence diagram illustrating the user information acquiring operation.

The scanner application 143 and the facsimile application 144 display a scanner operating screen 421 and a facsimile operating screen 422 on the touch panel 311 (shown in FIG. 4). When the operation to start a server information acquiring process is input through those operating screens, the scanner application 143 transmits a request to obtain server information to the UCS 168 (S10). In response to the request, the UCS 168 supplies the server information to the scanner application 143 or the like (S20).

The combination machine 101 of FIG. 1 can accumulate and manage server information (LDAP server information) on the HDD 233 or the like by the UCS 168. By doing so, the server information can be used when user information is acquired through a server (a LDAP server). The server information of each server is accumulated and managed on the HDD 233 or the like. The managing items of server information include "server name", "port number", and "IP address".

Figure 9:
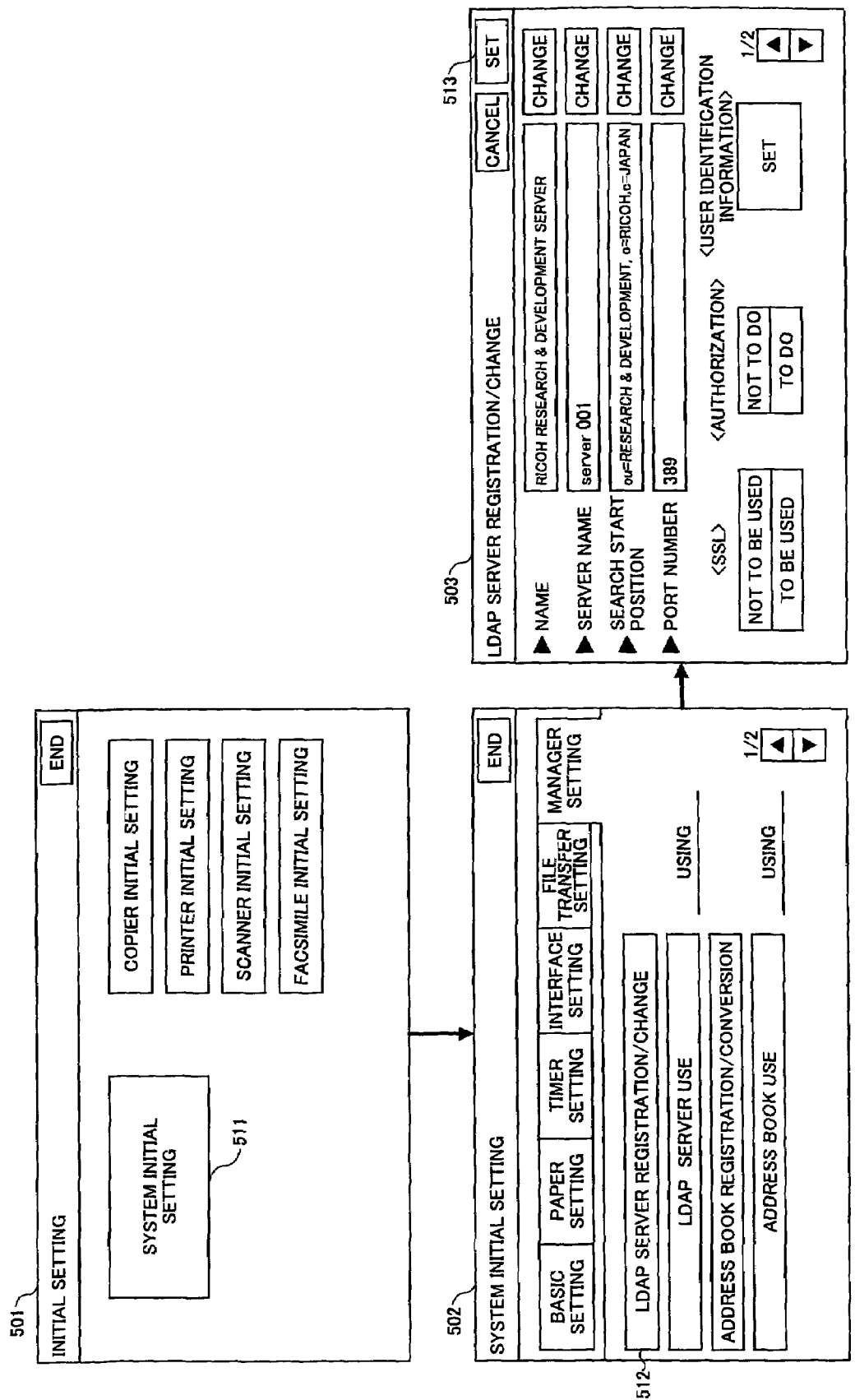
FIG. 9 is a screen transition chart illustrating a server information registering/changing operation.

The combination machine 101 of FIG. 1 can register and change server information. Referring now to FIG. 9, this operation is described. FIG. 9 shows a screen transition chart illustrating the server information registering and changing operation. An initial setting screen 501 displays the touch panel (FIG. 4) when the initializing button 315 (FIG. 4) is pressed. When a "system initializing button 511" is pressed on the initial setting screen 501, the screen changes to a system initial setting screen 502. When a "LDAP server registering/changing button 512" is touched on the system initial setting screen 502, the screen changes to a LDAP server registering/changing screen 503. As server information is input through the LDAP server registering/changing screen 503 and a "setting button 513" is touched, the server information is registered/changed. Those setting screens are displayed on the touch panel 311 (shown in FIG. 4) by the SCS 169.

After the procedures of S10 and S20, an input is performed to start a user information acquiring operation, and the scanner application 143 or the like transmits a request to search for the user information to the UCS 168 (S30). In response to the request, the UCS 168 requests the LDAP servers 401 for a searching operation (S40). In response to this request, the LDAP servers 401 send the search results to the UCS 168 (S50). The UCS 168 then transmits a user information search completion notification to the scanner application 143 or the like (S60). The scanner application 143 or the like transmits a user information acquiring request to the UCS 168 (S70). In response to this request, the UCS 168 supplies the user information to the scanner application 143 or the like (S80).

Figure 10:
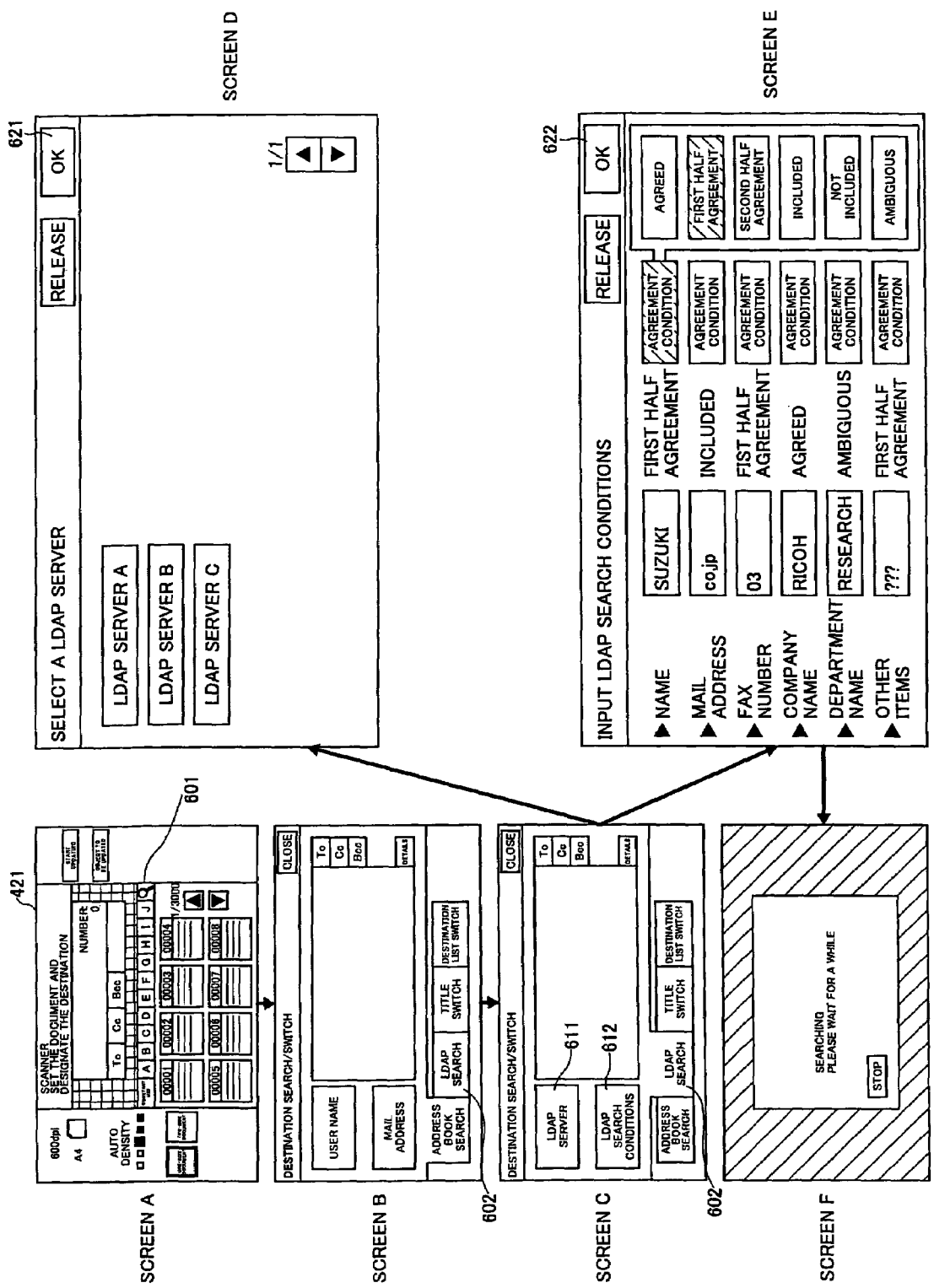
FIG. 10 is a screen transition chart illustrating the user information acquiring operation.

Referring now to FIG. 10, this operation is further described. FIG. 10 shows a screen transition chart illustrating the user information acquiring operation.

A screen A is a scanner operating screen 421. When a "loupe button 601" is touched on the screen A, the screen switches to a screen B. When a "LDAP search button 602" is touched on the screen B, the screen switches to a screen C. When a "LDAP server select button 611" is touched on the screen C, the screen switches to a screen D. When a LDAP server is selected and an "OK button 621" is touched on the screen D, the screen returns to the screen C. When a "LDAP search condition input button 612" is touched on the screen C, the screen switches to a screen E. When LDAP search conditions are input through the screen E and an "OK button 622" is touched on the screen E, the screen switches to a screen F. The user information is then displayed. The operation of touching the "OK button 621" on the screen D is equivalent to the operation to start the server information acquiring process. The operation of touching the "OK button 622", is equivalent to the operation to start the user information acquiring process (search process).

FIG. 11 shows the search results supplied from the LDAP servers 401 to the UCS 168 (S50), or the user information that is acquired from the LDAP servers 401 from the UCS 168. The acquired user information items include "cn", "sn", "givenName", "mail", and "facsimileTelephoneNumber". The LDAP servers 401 manage the user information as item values (attribute values) of the management items (attributes) such as "cn", "sn", "givenName", "mail", and "facsimile TelephoneNumber". To be more accurate, the characters such as Japanese characters that are not ASCII characters are encoded in the Base 64 format, but they are omitted from FIG. 11 for convenience.

Figure 6:
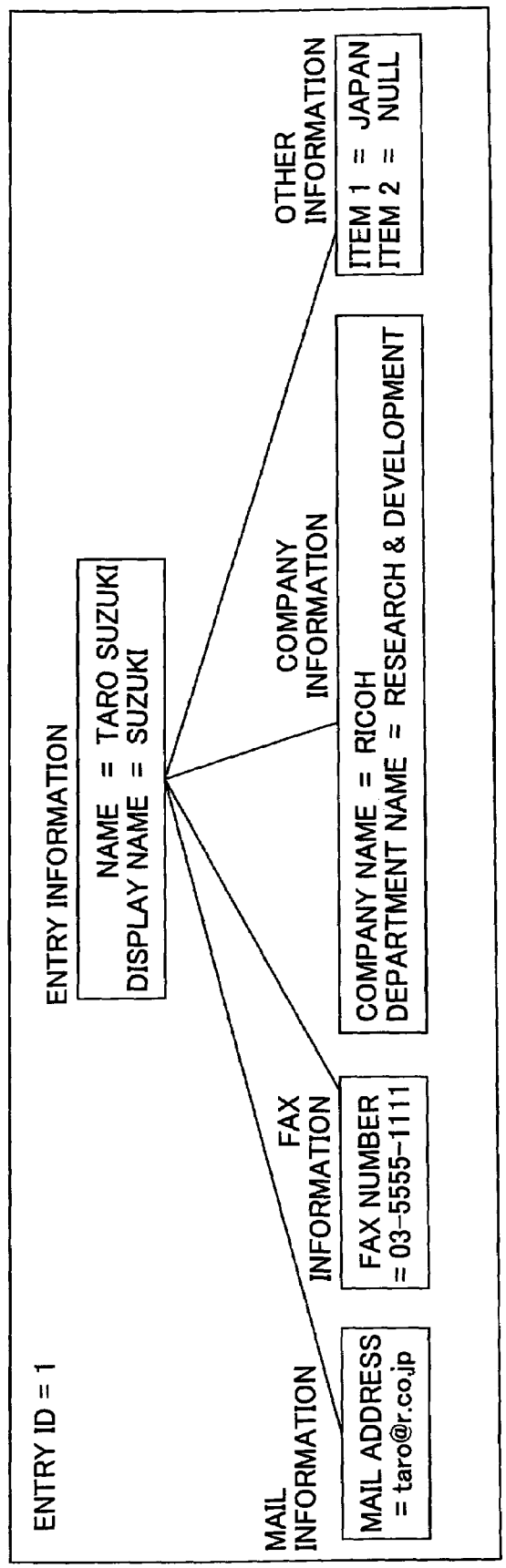
FIG. 6 illustrates the data structure of user information.

In the combination machine 101 of FIG. 1, the data structure of the user information acquired from the LDAP servers 401 by the UCS 168 is converted from the data structure shown in FIG. 11 into the data structure shown in FIG. 6 by the UCS 168 (S55) between the procedure of S50 and the procedure of S60 (shown in FIGS. 7 and 8). The UCS 168 replaces the user information items acquired from the LDAP servers 401 with the management items of user information in the combination machine 101. This is because the management items of user information in the LDAP servers 401 are different from the management items of user information in the combination machine 101. For example, although a mail address is managed as the item value of the management item "mail" in the LDAP servers 401 (FIG. 11), a mail address is managed as the item value of the management item "mail address" in the combination machine 101 (FIGS. 5 and 6).

Figure 12:
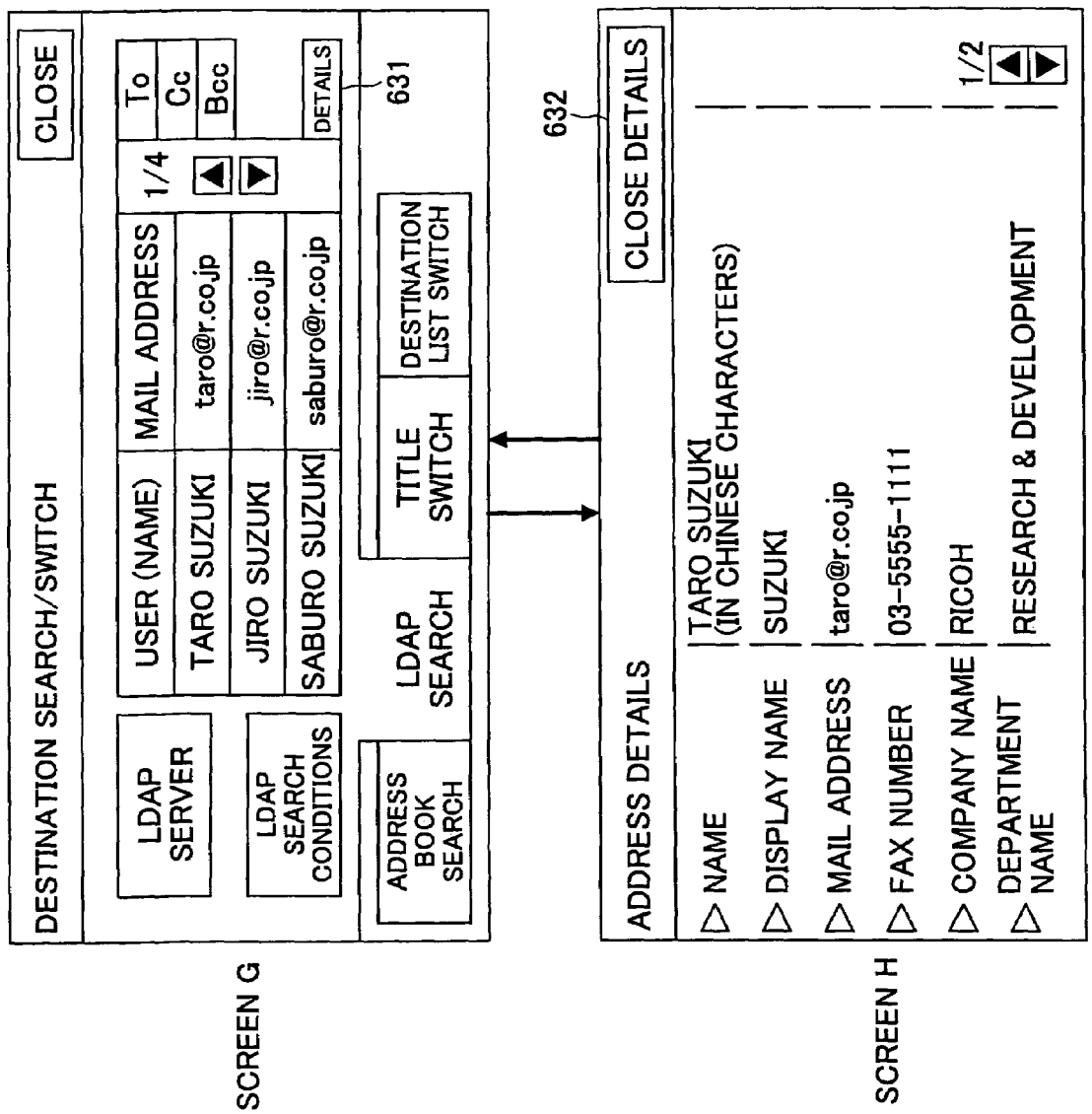
FIG. 12 is a screen transition chart that is continued from the screen transition chart of FIG. 10.

FIG. 12 shows a screen transition chart that follows the screen transition chart of FIG. 10. The screen F of FIG. 10 switches to a screen G of FIG. 12.

The user information supplied from the UCS 168 to the scanner application 143 or the like (S80) is displayed on the screen G. When the user "Taro Suzuki" is touched and a "details button 631" is touched on the screen G, the screen switches to a screen H. On the screen H, the details of the user information of the user "Taro Suzuki" that is supplied from the UCS 168 to the scanner application 143 or the like (S80) are displayed. When a "detail close button 632" is touched on the screen H, the screen returns to the screen G. The user information displayed on the screens G and H is the search results supplied from the LDAP servers 401 to the UCS 168 (S50), or the user information acquired from the LDAP servers 401 by the UCS 168. However, the user information acquired from the LDAP servers 401 by the UCS 168 is not displayed as it is, but the items of the acquired user information from the LDAP servers 401 are replaced with the management items of the user information in the combination machine 101. For example, the acquired item "mail" of the user information acquired from the LDAP servers 401 is replaced with the management item "mail address" of the user information in the combination machine 101.

(User Authorization)

The user authorization in the combination machine 101 of FIG. 1 is now described.

Figure 13:
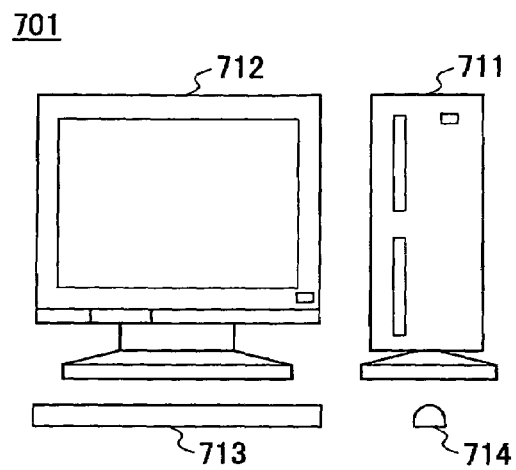
FIG. 13 illustrates a PC (personal computer) that is an embodiment of the present invention.
Figure 14:
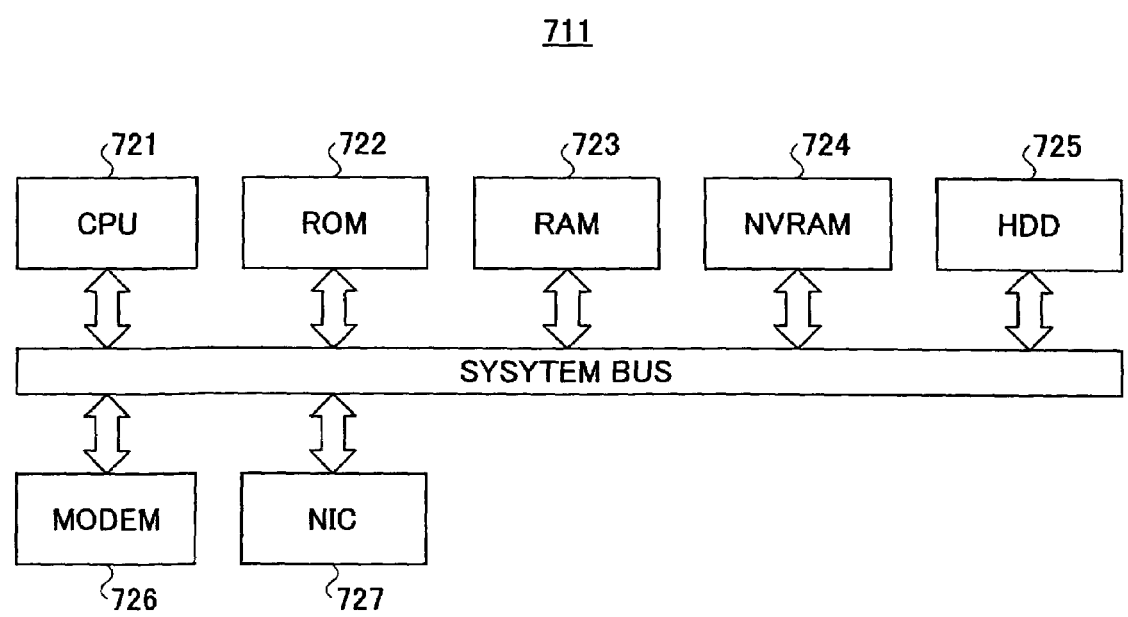
FIG. 14 illustrates the PC main body.
Figure 15:
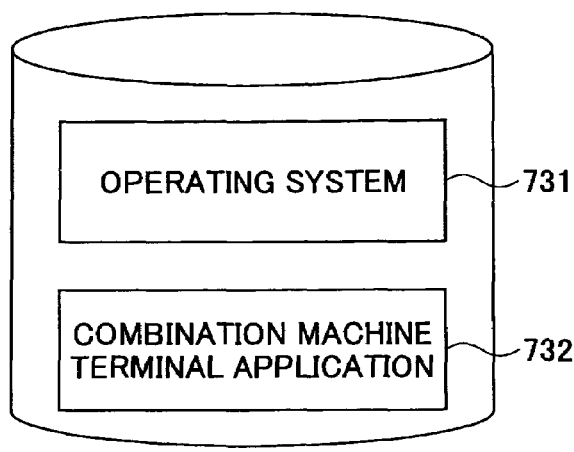
FIG. 15 illustrates the HDD of the PC of FIG. 13.

FIG. 13 illustrates a PC 701 that is an embodiment of the present invention. The PC 701 of FIG. 13 is formed with a PC main body 711, a display 712, a keyboard 713, and a mouse 714. As shown in FIG. 14, the PC main body 711 includes a ROM 722, a RAM 723, a NVRAM 724, a HDD 725, a MODEM 726, and a NIC 727. As shown in FIG. 15, an operating system 731 and a combination machine terminal application 732 are installed in the HDD 725.

Figure 16:
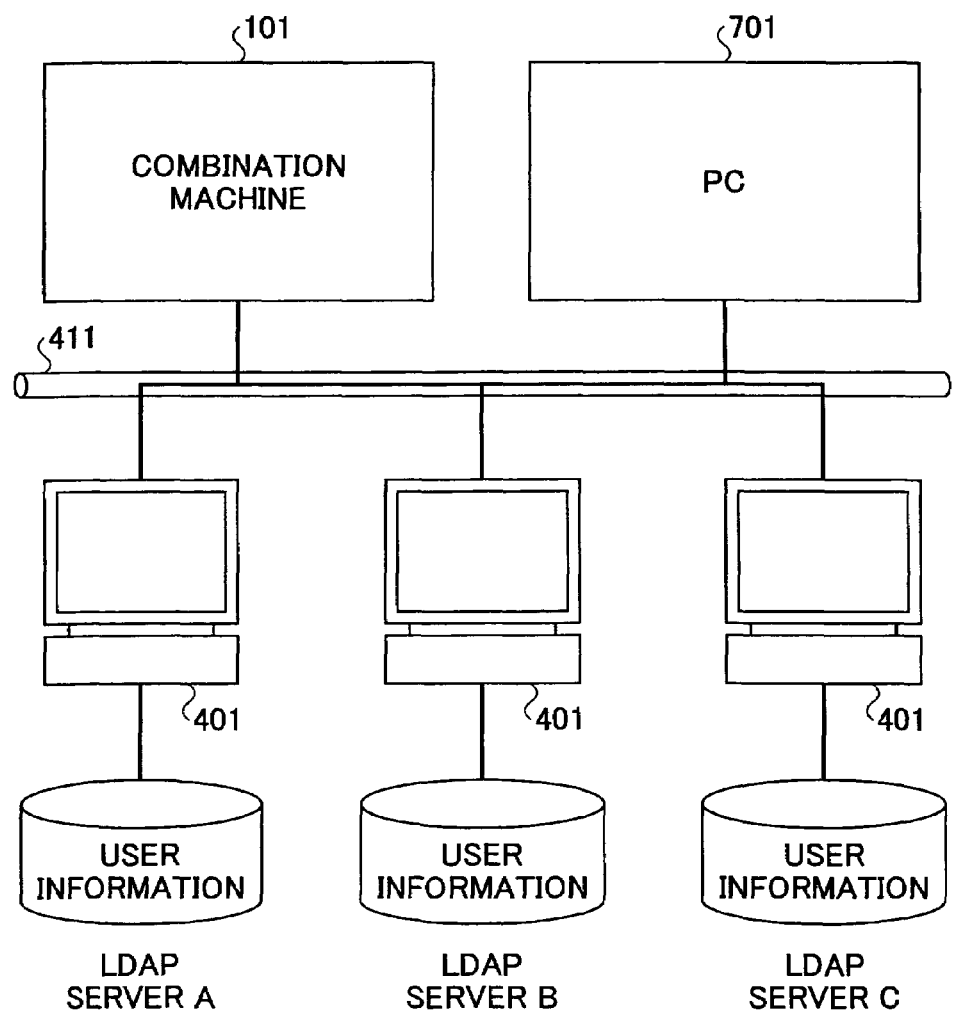
FIG. 16 illustrates the system structure of the combination machine.

As shown in FIG. 16, the combination machine 101 of FIG. 1 and the PC 701 of FIG. 13 are connected to the three LDAP servers 401 (the LDAP servers A, B, and C) via the network 411, and can function as clients (LDAP clients) of the LDAP servers 401. As shown in FIG. 16, the combination machine 101 of FIG. 1 and the PC 701 of FIG. 13 are connected to each other via the network 411.

Figure 17:
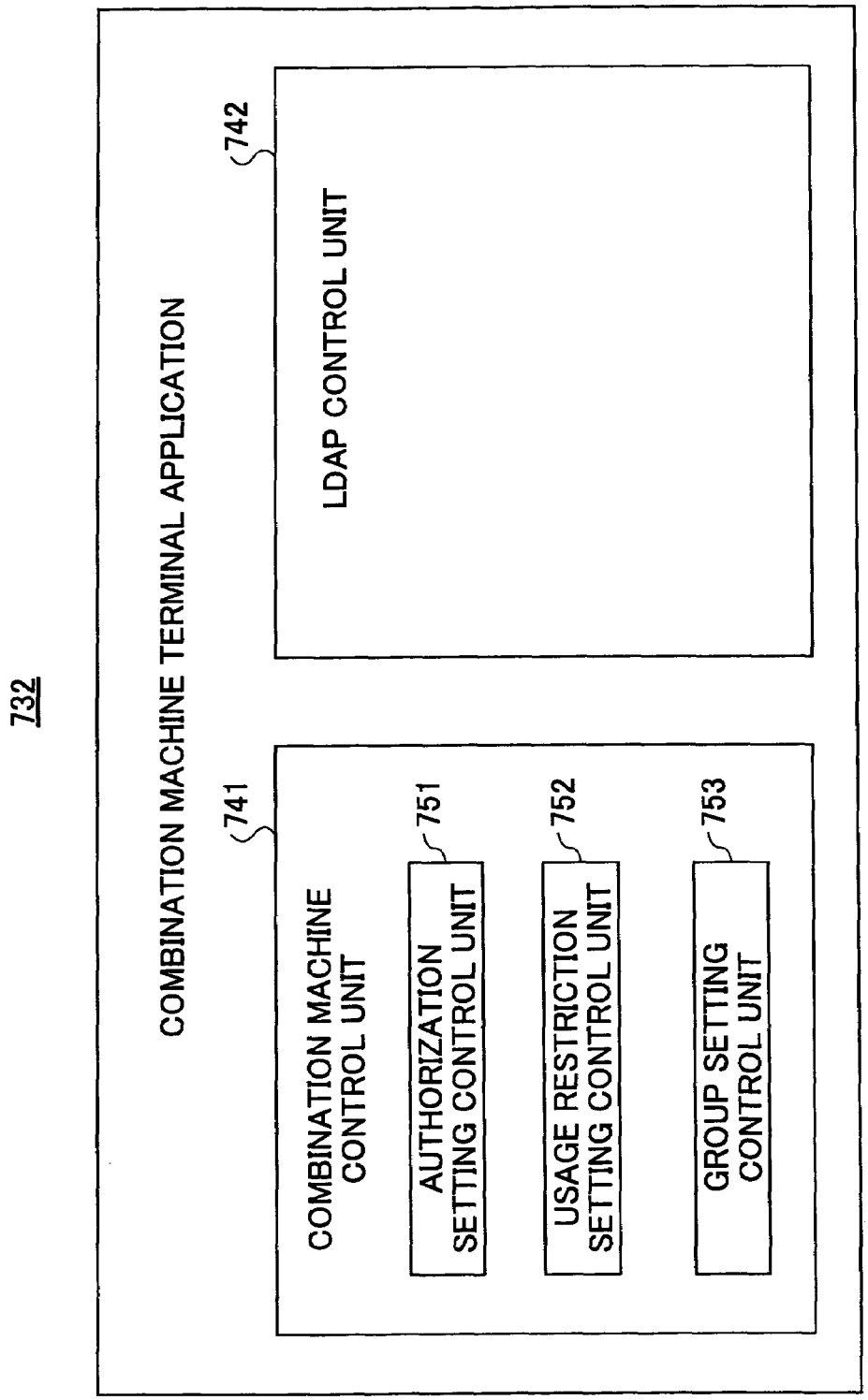
FIG. 17 is a function block diagram of the combination machine terminal application.

With the above facts being taken into consideration, the combination machine terminal application 732 of the PC 701 of FIG. 13 is now described. The combination machine terminal application 732 is an application for causing the PC 701 to function as a terminal of the combination machine 101. As shown in FIG. 17, the combination machine terminal application 732 includes a functional device control unit 741 that performs a control operation as a terminal of the combination machine 101, and a LDAP control unit 742 that performs a control operation as a client of the LDAP servers 401. An authorization setting control unit 751, a usage restriction setting control unit 752, and a group setting control unit 753 of the combination machine control unit 741 function to provide an authorization setting screen, a usage restriction setting screen, and a group setting screen, as described later. Those setting screens are displayed on the display 712, and the setting operations on those setting screens are performed with the keyboard 713 and the mouse 714.

Figure 18:
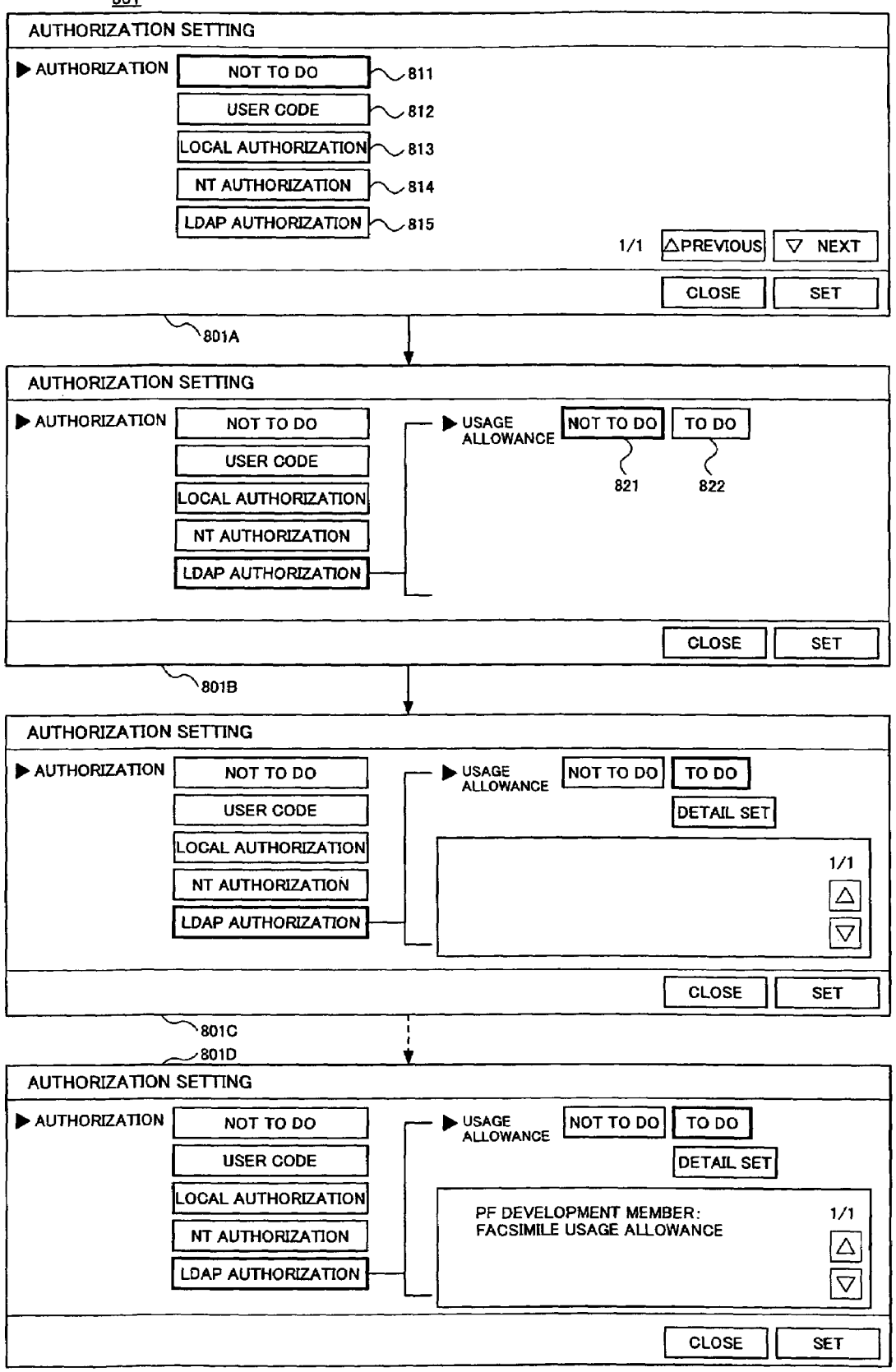
FIG. 18 is a screen transition chart with respect to the authorization setting screen.

FIG. 18 is a screen transition chart with respect to an authorization setting screen 801. The authorization setting screen 801 is a setting screen for setting conditions with respect to an authorization process for a user to use the combination machine 101. The respective images to be shown on the authorization setting screen 801 are distinguished from one another with attached alphabets in FIG. 18.

A button 811 is a button for setting such conditions as not to authorize a user to use the combination machine 101. A button 813 is a button for setting conditions for the combination machine 101 to authorize a user to use the combination machine 101. A button 814 is a button for setting conditions for an NT server to authorize a user to use the combination machine 101. A button 815 is a button for setting conditions for a LDAP server to authorize a user to use the combination machine 101.

When the button 815 is clicked on the authorization setting screen 801A, the screen switches to an authorization setting screen 801B. When a "set" button is clicked on the authorization setting screen 801B, conditions for causing the LDAP servers 401 to authorize a user to use the combination machine 101 are set in the combination machine 101. In the above procedures, the authorization setting control unit 751 is involved in the PC 701. In the combination machine 101, the SCS 169, the UCS 168, and the CCS 167 are involved in the above procedures. The information as to which LDAP server is to perform the authorizing operation, and the LDAP server information as to which LDAP server is to cause another LDAP server to perform the authorizing operation are set in advance.

Figure 19:
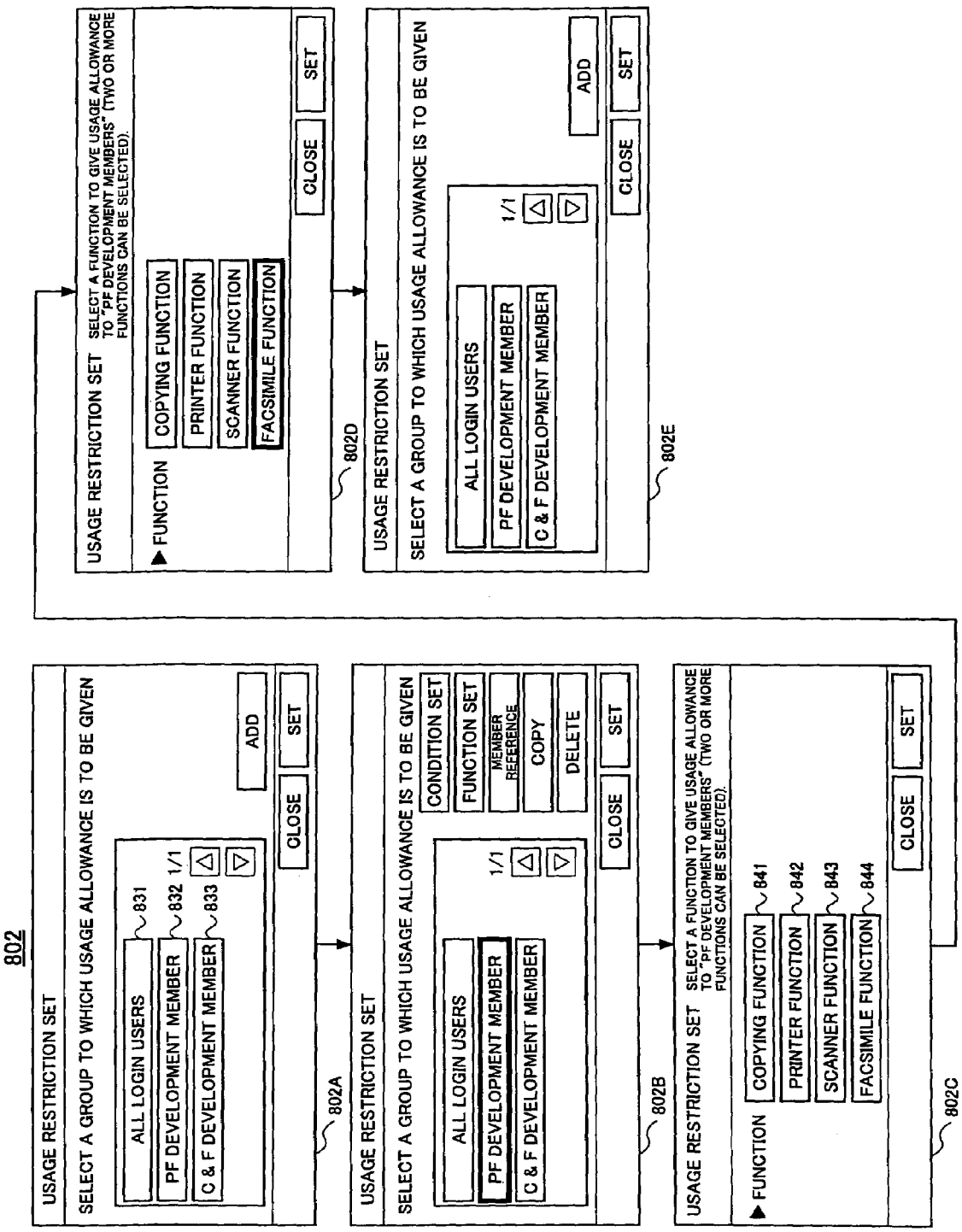
FIG. 19 is a screen transition chart with respect to the usage restriction setting screen.

FIG. 19 is a screen transition chart with respect to the usage restriction setting screen 802. The usage restriction setting screen 802 is a setting screen for setting restrictions on users using the combination machine 101. The respective images to be shown on the usage restriction setting screen 802 are distinguished from one another with attached alphabets.

A button 821 (FIG. 18) is to set conditions in the combination machine 101 for not releasing the restrictions (usage allowance) on users to use the combination machine 101, in the case where the conditions for causing the LDAP servers to authorize a user to use the combination machine 101 are set in the combination machine 101. A button 822 (FIG. 18) is to set conditions for releasing the restrictions (usage allowance) on users to use the combination machine 101, in the case where the conditions for causing the LDAP servers to authorize a user to use the combination machine 101 are set in the combination machine 101.

A button 832 is to set conditions for releasing/not releasing (usage allowance/prohibition) the restrictions on "PF development members" to use the combination machine 101 all at once. With the button 832, the conditions for releasing/not releasing (usage allowance/prohibition) the restrictions on users to use the combination machine 101 can be set in the combination machine 101 by each "PF development group". A button 833 is to set conditions for releasing/not releasing (usage allowance/prohibition) the restrictions on "C & F development members" to use the combination machine 101 all at once. With the button 833, the conditions for releasing/not releasing (usage allowance/prohibition) the restrictions on users to use the combination machine 101 can be set in the combination machine 101 by each "C & F development group".

A button 841 is to set conditions in the combination machine 101 for allowing the PF development members to use the copying function of the combination machine 101. A button 842 is to set conditions in the combination machine 101 for allowing the PF development members to use the printing function of the combination machine 101. A button 843 is to set conditions in the combination machine 101 for allowing the PF development members to use the scanning function of the combination machine 101. A button 844 is to set conditions in the combination machine 101 for allowing the PF development members to use the facsimile function of the combination machine 101.

When the button 822 is clicked on the authorization setting screen 801B (FIG. 18), the screen switches to the authorization setting screen 801C (FIG. 18). When the "detail setting" button is clicked on the authorization setting screen 801C (FIG. 18), the screen switches to the usage restriction setting screen 802A. When the button 832 is clicked on the usage restriction setting screen 802A, the screen switches to the usage restriction setting screen 802B. When the "function setting" button is clicked on the usage restriction setting screen 802B, the screen switches to the usage restriction setting screen 802C. When the button 844 is clicked on the usage restriction setting screen 802C, the screen switches to the usage restriction setting screen 802D. When the "set" button is clicked on the usage restriction setting screen 802D, the screen switches to the usage restriction setting screen 802E. When the "set" button is clicked on the usage restriction setting screen 802E, the screen switches to the authorization setting screen 801D (FIG. 18). When the "set" button is clicked on the authorization setting screen 801D (FIG. 18), the conditions for notifying the PF development members of the usage allowance of the facsimile function of the combination machine 101. Thus, the conditions for releasing the restrictions (usage allowance) on users to use the facsimile function of the combination machine 101 are set in the combination machine 101 by each "PF development group". In the above procedures, the usage restriction setting control unit 752 is mainly involved in the PC 701. In the combination machine 101, the SCS 169, the UCS 168, and the CCS 167 are involved in the above procedures.

Figure 20:
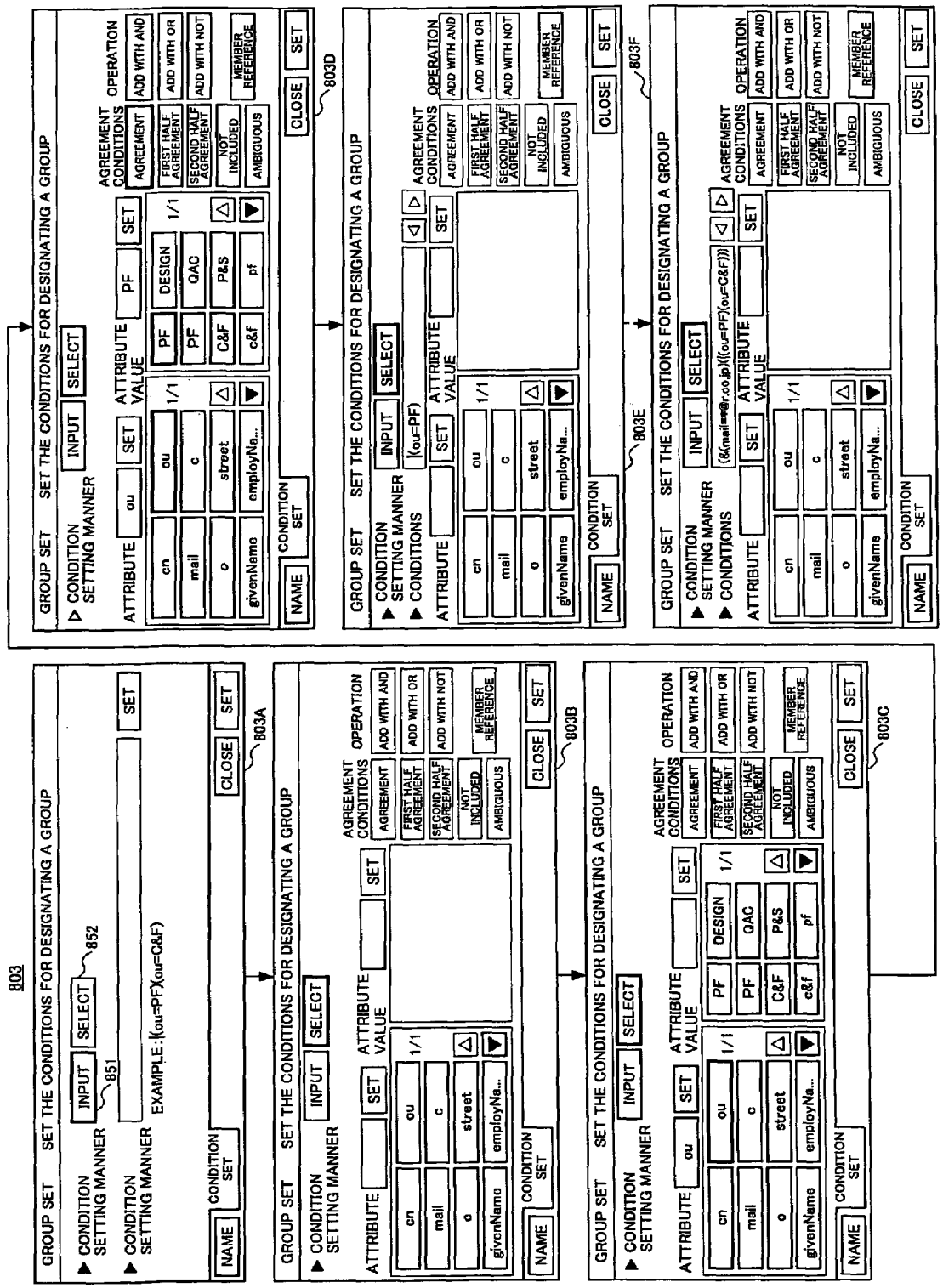
FIG. 20 is a screen transition chart with respect to the group setting screen.

FIG. 20 is a screen transition chart with respect to a group setting screen 803. The group setting screen 803 is a setting screen for setting the groups of users whose user information is managed by the LDAP servers 401 in the combination machine 101. The respective images to be shown on the group setting screen 803 are distinguished from one another with attached alphabets in FIG. 20.

On the group setting screen 803, the groups of users whose user information is managed by the LDAP servers can be set. The "PF development group" and the "C & F development group" shown on the usage restriction setting screen 802 (FIG. 19) are examples of such groups, and are formed with the "PF development members" and the "C & F development members" whose user information is managed by the LDAP servers.

On the group setting screen 803, it is possible to set a group that is specified by whether the user information of a user managed by a LDAP server with respect to whether the user is a member of the group satisfies the "condition" that a predetermined attribute value is stored in a predetermined attribute. For example, "ou=PF" indicates "whether the attribute value PF is stored in the attribute ou", "ou=C&F" indicates "whether the attribute value C&F is stored in the attribute ou", "|(ou=PF)(ou=C&F) indicates "whether the attribute value PF is stored in the attribute ou, or whether the attribute value C&F is stored in the attribute ou", "&(ou=PF)(mail=*r.co.jp)" indicates "whether the attribute value PF is stored in the attribute ou", and whether the attribute value "r.co.jp" is stored after the attribute "mail". Whether a user belongs to a group to be set on the group setting screen 803 is determined by whether the user information of the user satisfies the above conditions with respect to the group.

A button 851 is a button for displaying the group setting screen 803 on which the above "conditions" are set through a character inputting operation (a keyboard operation). A button 852 is a button for displaying the group setting screen 803 on which the above "conditions" are set through a display object selecting operation (a mouse operation).

When the "add" button is clicked on the usage restriction setting screen 802A or 802E (FIG. 19), the screen switches to the group setting screen 803A. On the group setting screen 803A, the above "conditions" can be set through a character inputting operation. When the button 852 is clicked on the group setting screen 803A, the screen switches to the group setting screen 803B. On the group setting screen 803B, the above "conditions" can be set through a display object selecting operation.

The group setting screens 803B, 803C, and 803D show the "attribute" selecting operation and the "attribute value" selecting operation to set the condition of "ou=PF", i.e., "whether the attribute value PF is stored in the attribute ou". When "ou" under the column "attribute" is clicked on the group setting screen 803B, the screen switches to the group setting screen 803C. When "PF" under the column "Attribute Value" is clicked, and "agreement" under the column "Agreement Condition" is clicked on the group setting screen 803C, the screen switches to the group setting screen 803D.

The group setting screens 803D, 803E, and 803F show the "attribute" selecting operation, the "attribute value" selecting operation, and the "AND, OR, NOT" selecting operation to set the condition of (&(mail=*@r.co.jp) (|(ou=PF) (ou=C&F))). When "add with OR" under the column "Operation" is clicked on the group setting screen 803D, the screen switches to the group setting screen 803E. After that, the same operation is repeated so as to switch the screen to the group setting screen 803F.

When the "set" button is clicked on the group setting screen 803A, 803D, 803E, or 803F, the screen switches to the usage restriction setting screen 802A or 802E (FIG. 19). When the "set" button is clicked on the usage restriction setting screen 802A or 802E (FIG. 19), the screen switches to the authorization setting screen 801D (FIG. 18). When the "set" button is clicked on the authorization setting screen 801D (FIG. 18), the group that is specified by whether the user information of a user managed by a LDAP server with respect to whether the user is a member of the group satisfies the "condition" that the predetermined attribute value is stored in the predetermined attribute is set in the combination machine 101. During the above operation, the group setting control unit 753 is mainly involved in the PC 701, and the SCS 169, the UCS 168, and the CCS 167 are involved in the combination machine 101.

Figure 21:
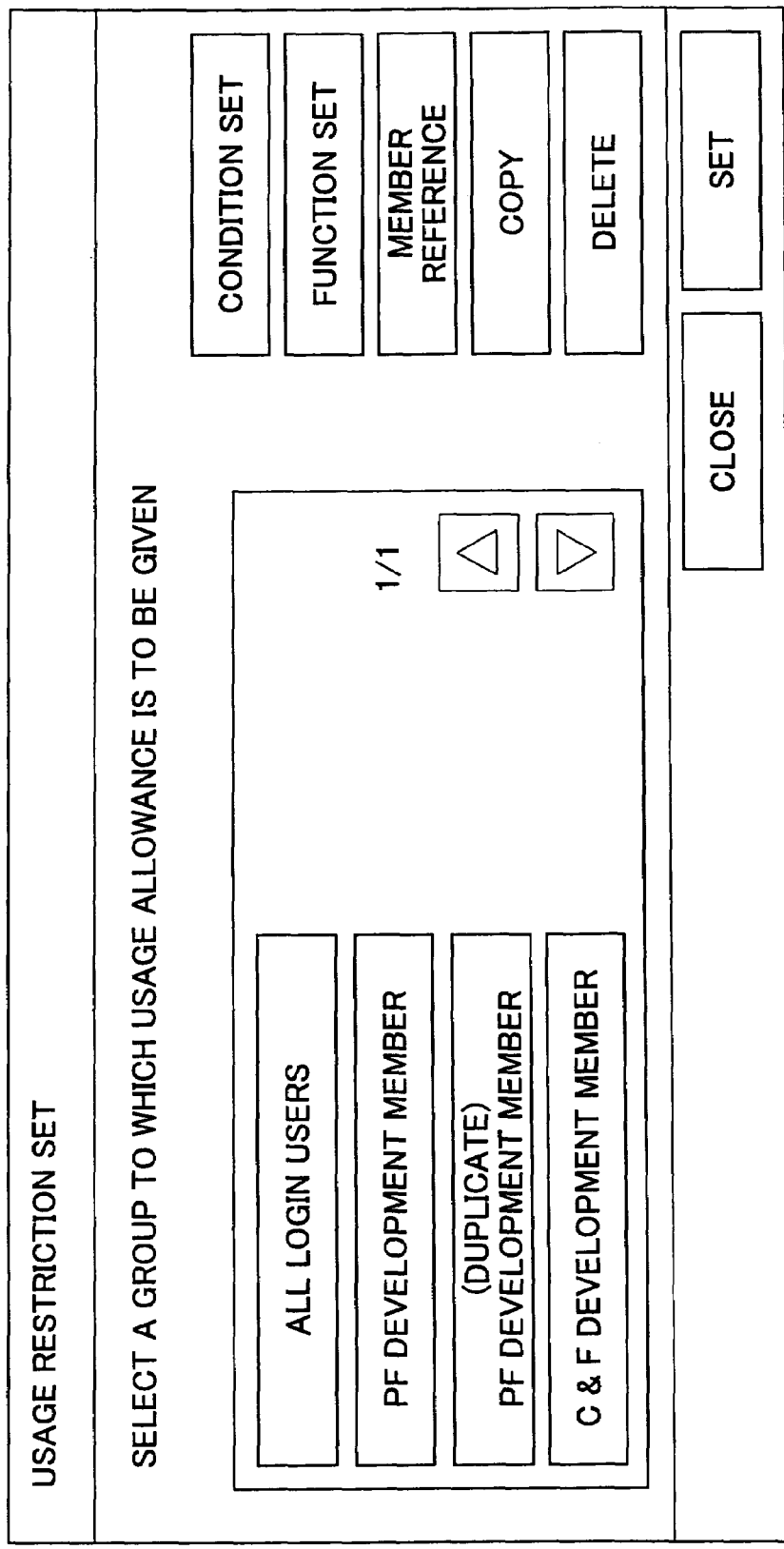
FIG. 21 shows a screen image illustrating a copying operation.

FIG. 21 shows a screen to be used for copying a group. In FIG. 19, when the "PF development member" button is clicked on the usage restriction setting screen 802A, the screen switches to the usage restriction setting screen 802B. When the "copy" button is clicked on the usage restriction setting screen 802B, the screen switches to the usage restriction setting screen 802F of FIG. 21. By doing so, the "PF development group" is duplicated. The duplicating is performed when another group is set on the same condition as a group. For example, duplicating is performed in a case where a "PF development UCS group" that is formed with the UCS members among the PF development members is set.

Figure 22:
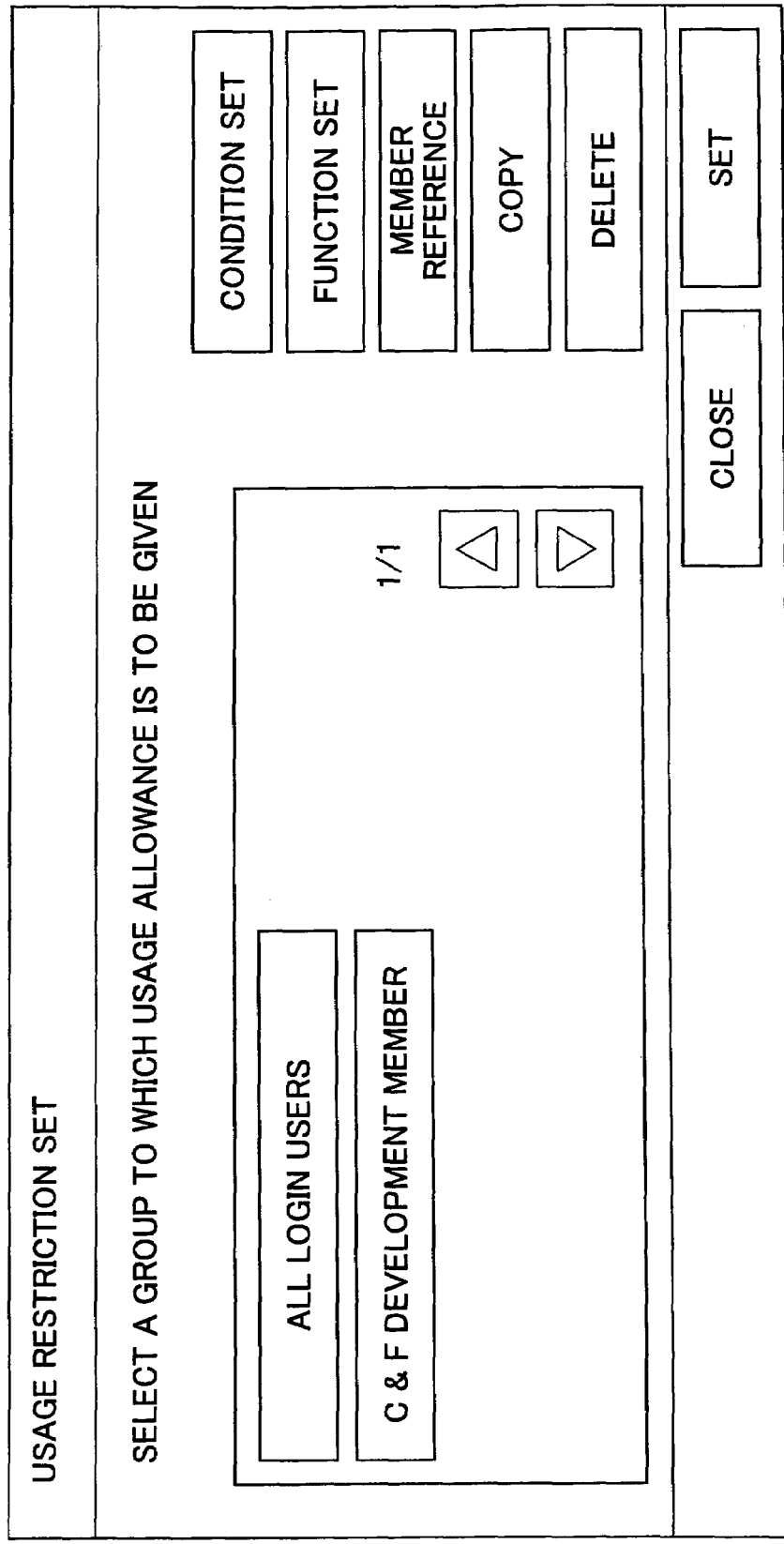
FIG. 22 shows a screen image illustrating a deleting operation.

FIG. 22 shows a screen that is to be used to delete a group. In FIG. 19, when the "PF development member" button is clicked on the usage restriction setting screen 802A, the screen switches to the usage restriction setting screen 802B. When the "delete" button is clicked on the usage restriction setting screen 802B, the screen switches to the usage restriction setting screen 802G of FIG. 22. Thus, the "PF development group" is deleted.

Figure 23:
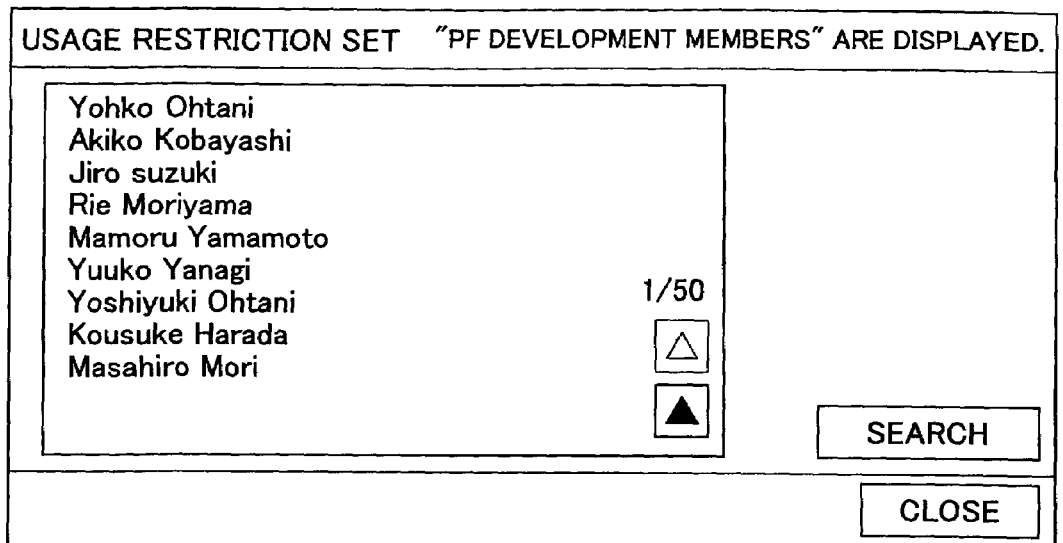
FIG. 23 shows a screen image illustrating a referring operation.

FIG. 23 shows a screen that is to be used to refer to a user that belongs to a group. In FIG. 19, when the "PF development member" button is clicked on the usage restriction setting screen 802A, the screen switches to the usage restriction setting screen 802B. When the "member reference" button is clicked on the usage restriction setting screen 802B, the screen switches to the usage restriction setting screen 802H of FIG. 23. Thus, a user that belongs to the "PF development group" can be referred to.

Figure 24:
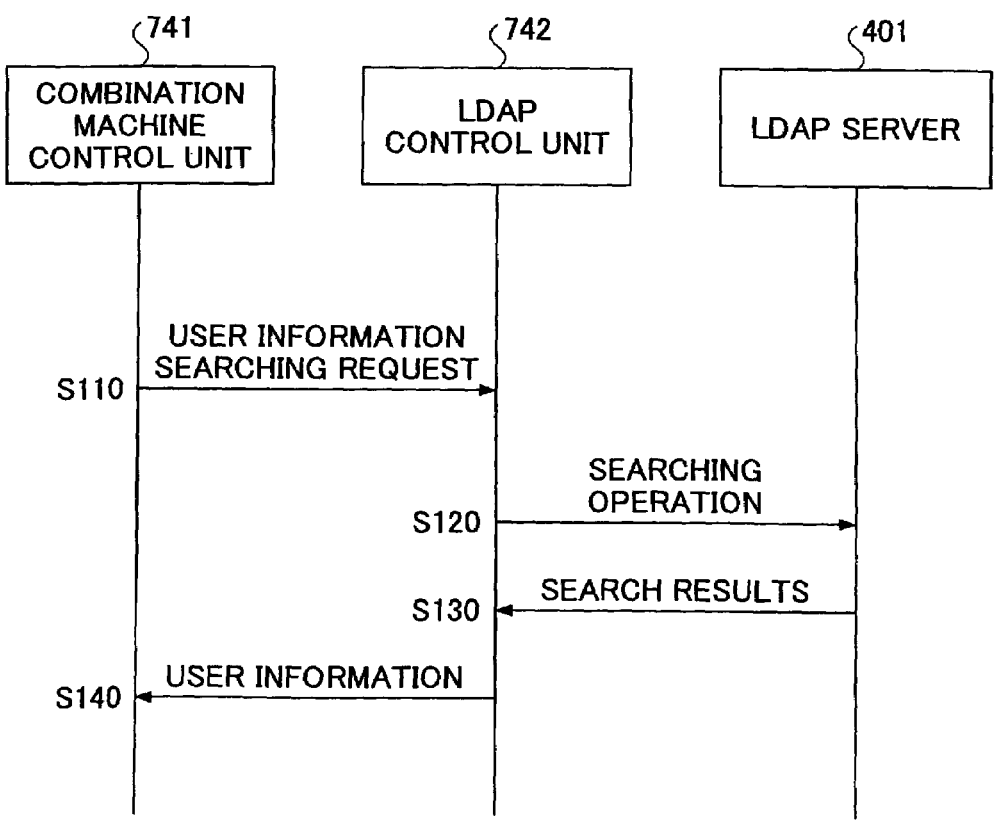
FIG. 24 is a sequence diagram of the operation of displaying the usage restriction setting screen of FIG. 23.

FIG. 24 is a sequence diagram showing the procedures for displaying the usage restriction setting screen 802H of FIG. 23. When the "PF development member" button is clicked on the usage restriction setting screen 802A, the screen switches to the usage restriction setting screen 802B. When the "member reference" button is clicked on the usage restriction setting screen 802B, a request to search for user information is transmitted from the combination machine control unit 741 to the LDAP control unit 742 (S110). In response to this, a request for a search operation is transmitted from the LDAP control unit 742 to the LDAP servers 401 (S120). Upon receipt of this request, the LDAP servers 401 supply the search results to the LDAP control unit 742 (S130). Upon receipt of the search results, the LDAP control unit 742 supplies user information to the combination machine control unit 741 (S140). The screen then switches to the usage restriction setting screen 802G. As the LDAP search condition (filter), the LDAP search conditions for searching for the PF development members are used. In other words, the conditions set on the group setting screen 803 to specify the PF development group are used.

The combination machine terminal application 732 can supply the group setting screen 803 on which the group setting operation can be performed through the "group icon" operation and the "class icon" operation. In other words, the combination machine terminal application 732 provides the group setting screen 803 on which the "hierarchical structure" of the groups is handled. The group icons represent the respective groups, and the class icons represent the group hierarchy.

Figure 25:
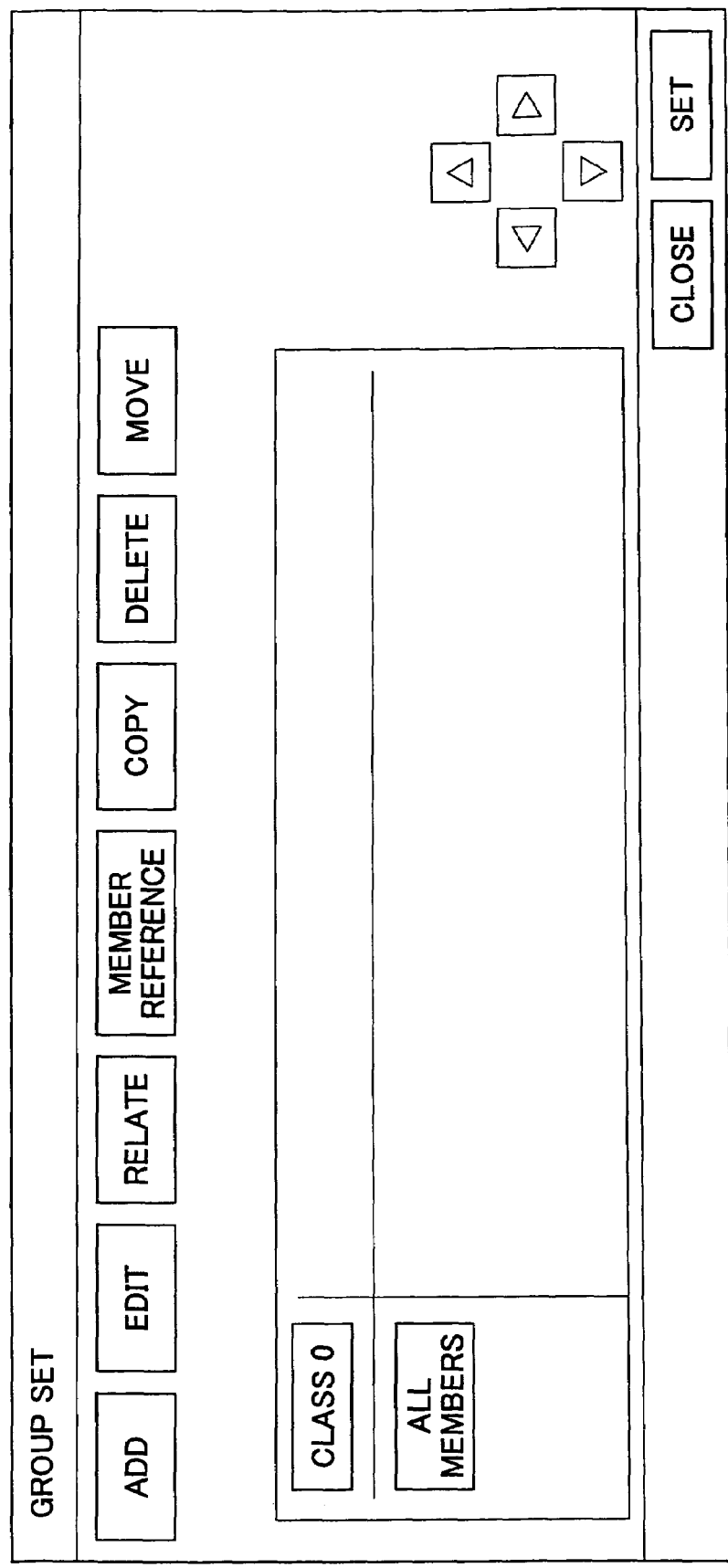
FIG. 25 shows a screen image with respect to a group setting operation.

FIG. 25 shows the above described group setting screen 803. On the group setting screen 803G, "add", "edit", "relate", "member reference", "copy", "delete", and "move" buttons are provided. The copying operation using the "copy" button, the deleting operation using the "delete" button, and the referring operation using the "member reference" button are the same as the respective operations illustrated in FIGS. 21, 22, and 23.

Figure 26:
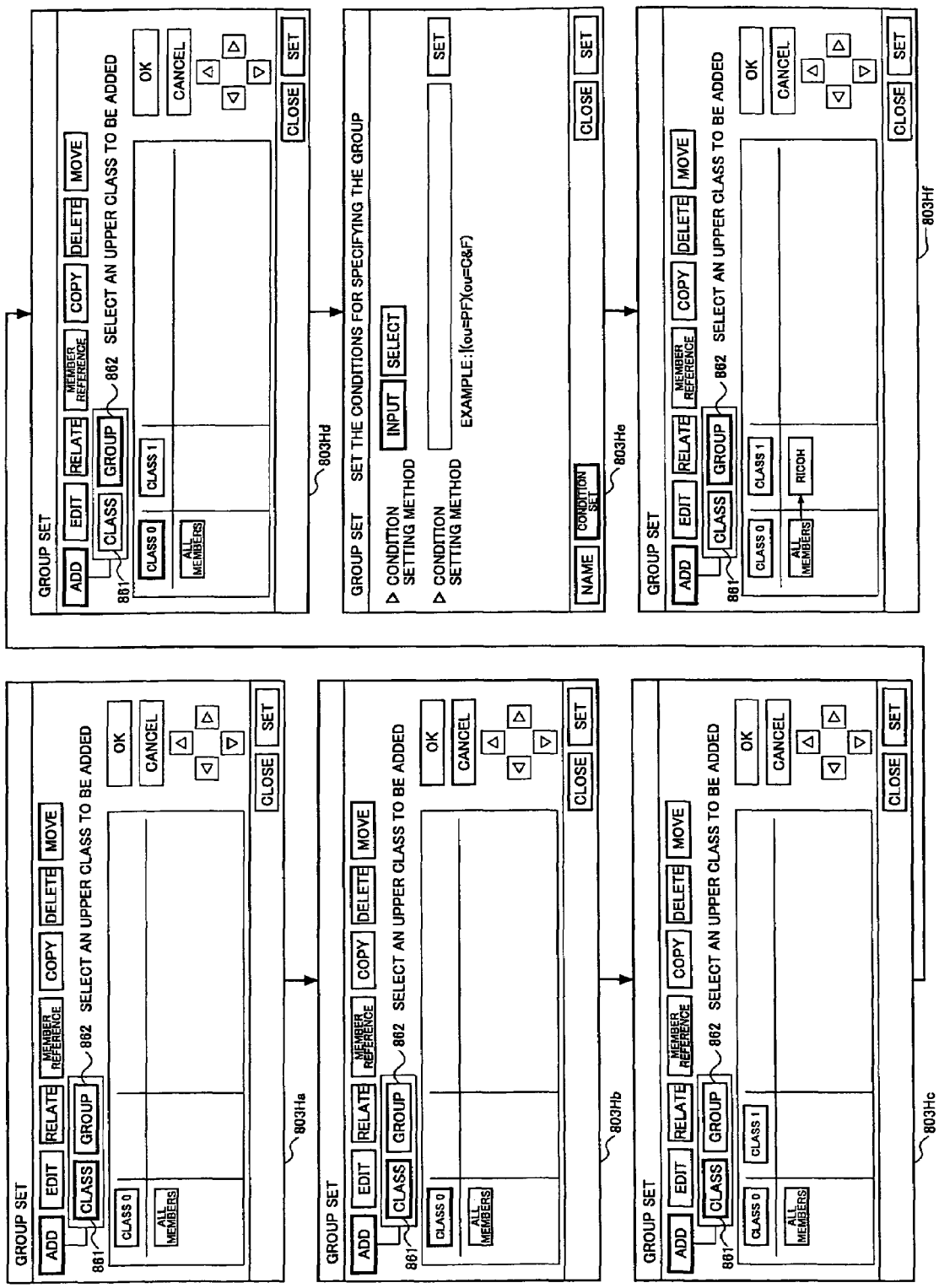
FIG. 26 is a screen transition chart with respect to an adding operation.

FIG. 26 is a screen transition chart with respect to the adding operation. When the "add" button on the group setting screen 803G (FIG. 25) is clicked, a class button 861 and a group button 862 appear on the screen, as shown on a group setting screen 803Ha. When the class icon "class 0" is clicked on the group setting screen 803Ha, the screen switches to a group setting screen 803Hb. When the OK button is clicked on the group setting screen 803Hb, the class icon "class 1" appears on the screen, as shown on a group setting screen 803Hc. When the group button 862 is clicked on the group setting screen 803Hc, the screen switches to a group setting screen 803Hd. When the class icon "class 1" is clicked on the group setting screen 803Hd, the screen switches to a group setting screen 803He. The group setting screen 803He is the same group setting screen 803 as the group setting screen 803A (FIG. 20), and the conditions for specifying a group can be set through the group setting screen 803He. When the "set" button is clicked on the group setting screen 803He, the group icon "Ricoh" appears on the screen, as shown on a group setting screen 803Hf. Thus, the group "Ricoh" is added to the class "1" that is lower than the class "0".

FIG. 27 is a screen transition chart with respect to the relating operation. When the "relate" button is clicked on the group setting screen 803G (FIG. 25), the screen switches to a group setting screen 803Ia. For ease of explanation, various adding operations have already been performed in the following situations. When the group icons "Ricoh", "PF development group", and "C&F development group" are clicked on the group setting screen 803Ia, the screen switches to a group setting screen 803Ib. When the OK button is clicked on the group setting screen 803Ib, the arrows that connect the group icons "Ricoh", "PF development group", and "C&F development group" appear on the screen, as shown on a group setting screen 803Ic. Through this operation, the group "Ricoh" of the class "1" is related to the group "PF development group" of the class "2" and the group "C&F development group" of the class "2".

FIG. 28 is a screen transition chart with respect to the deleting operation. When the "delete" button is clicked on the group setting screen 803G (FIG. 25), the screen switches to a group setting screen 803Ja. For ease of explanation, various adding operations have already been performed in each of the following situations. When the group icon "PF development group" is clicked on the group setting screen 803Ja, the screen switches to a group setting screen 803Jb. When the OK button is clicked on the group setting screen 803Jb, the group icon "PF development group" disappears from the screen, as shown on a group setting screen 803Jc. Thus, the group "PF development group" of the class "2" is deleted. At the same time, the arrow relating to the group icon "PF development group" disappears from the screen. Thus, the relation to the "PF development group" of the class "2" is deleted.

Figure 29:
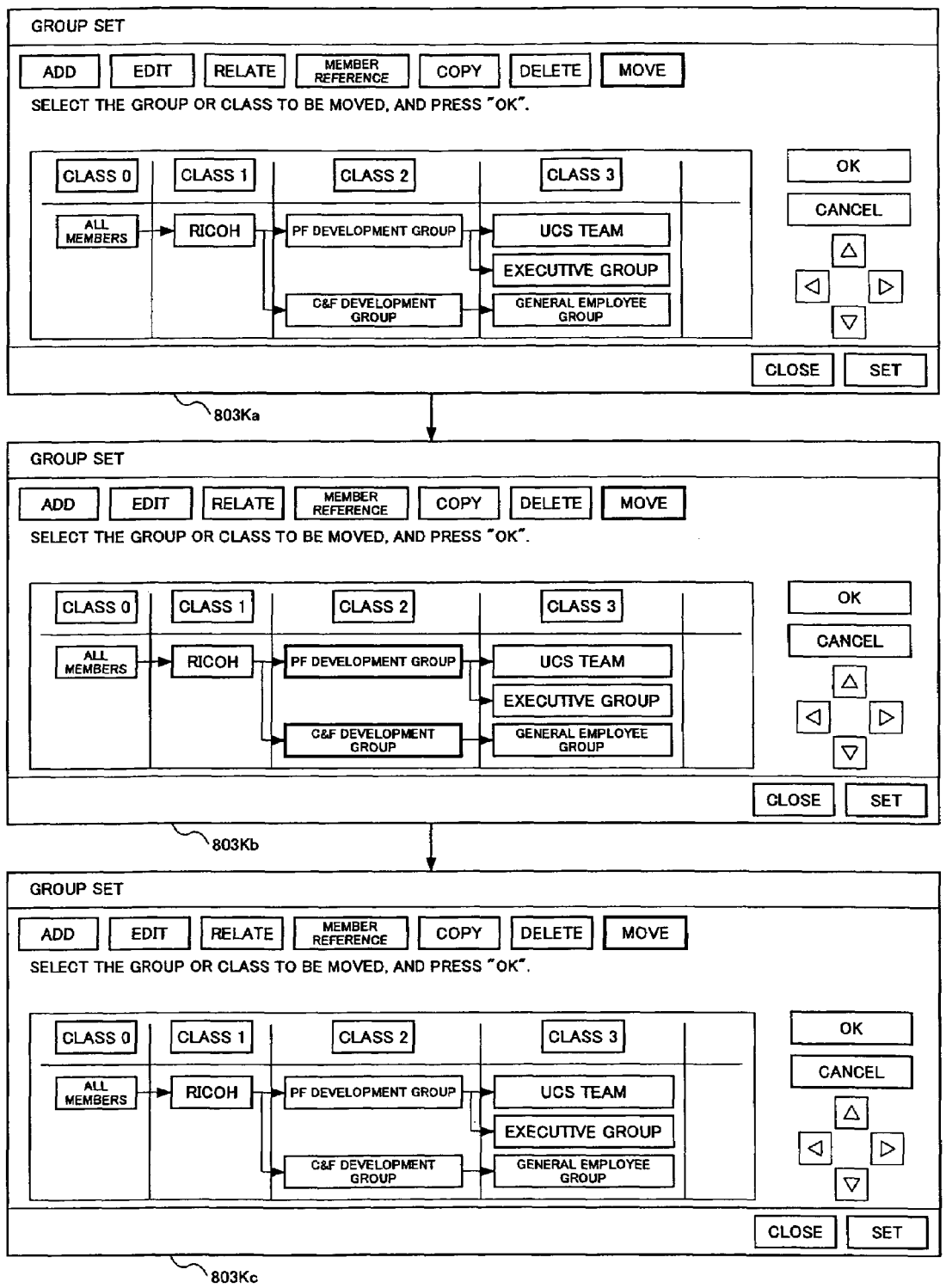
FIG. 29 is a screen transition chart with respect to a moving operation.

FIG. 29 is a screen transition chart with respect to the moving operation. When the "move" button is clicked on the group setting screen 803G (FIG. 25), the screen switches to a group setting screen 803Ka. For ease of explanation, various adding operations have already been performed in each of the following situations. When the group icons "PF development group" and the "C&F development group" are clicked on the group setting screen 803Ka, the screen switches to a group setting screen 803Kb. When the OK button is clicked on the group setting screen 803Kb, the positions of the group icons "PF development group" and "C&F development group" move on the screen. Here, the arrows relating to the group icons "PF development group" and "C&F development group" remain in the same positions.

Figure 30:
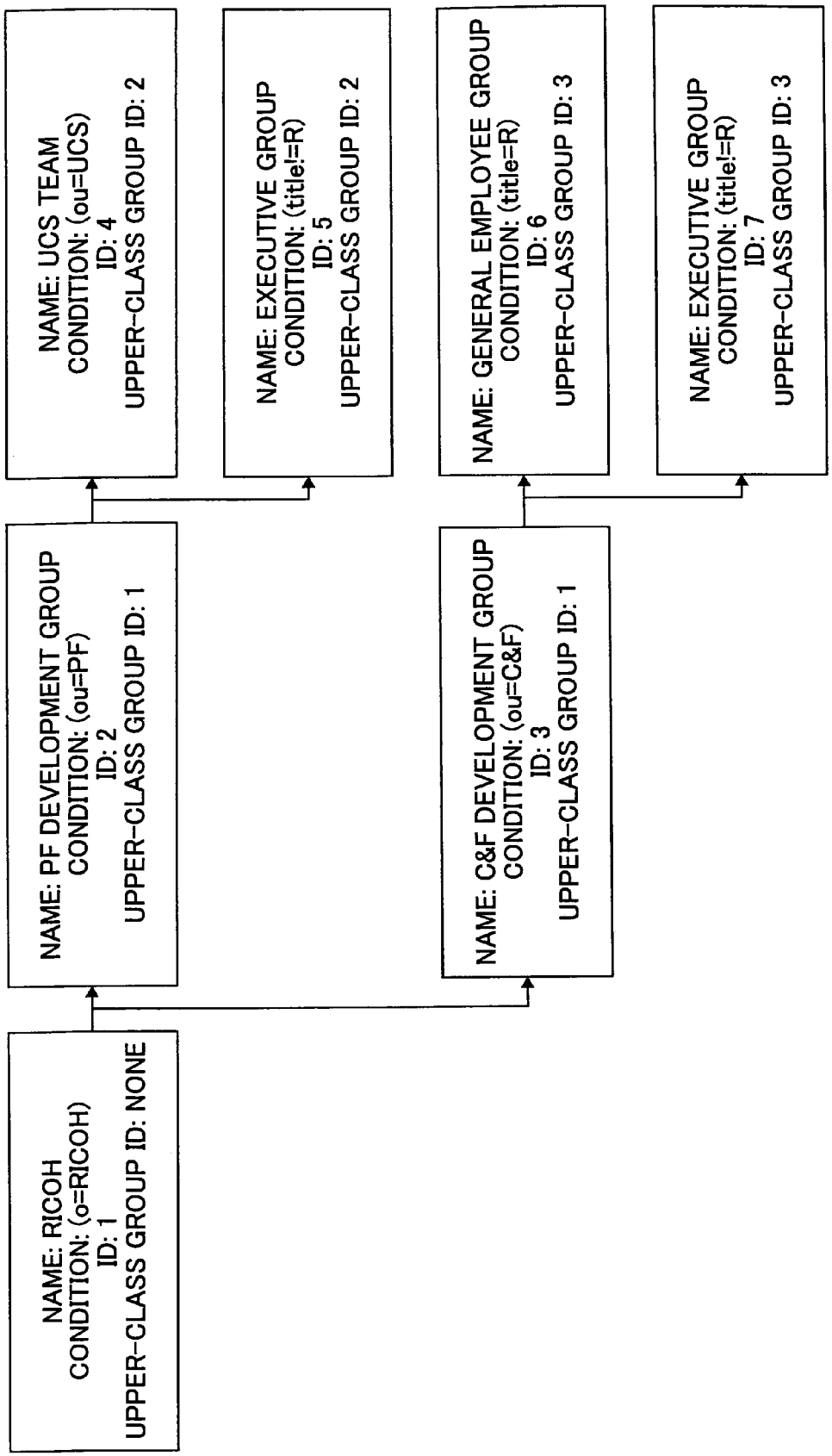
FIG. 30 illustrates the hierarchical structure of the groups that are set through the group setting screen of FIG. 25.

FIG. 30 illustrates the hierarchical structure of the groups that are set on the group setting screen 803 of FIG. 25. The group icons represent the respective groups, and the arrows connecting the group icons represent the relations among the groups. If there is an arrow extending from a group icon A to a group icon B, or if the group A is related to the group B, the conditions for specifying the group A are also a part of the conditions for specifying the group B. For example, the conditions for specifying the group "PF development group" are "&(o=RICOH)(ou=PF)", which is partially the same as the conditions for specifying the group "Ricoh". The conditions for specifying the group "UCS team" are "&(&(o=RICOH)(ou=PF))(ou=UCS)", which is partially the same as the conditions for specifying the group "Ricoh" and the conditions for specifying the group "PF development group".

FIG. 31 shows XML (extensible Markup Language) data with respect to the groups that are set through the group setting screen 803 of FIG. 25. The groups set through the group setting screen 803 of FIG. 25 are written in the XML and are set in the combination machine 101 by the SOAP (Simple Object Access Protocol). The set items of group information include "group name", "group conditions", "group ID", "the number of upper-class groups", and "group ID of upper-class group".

Figure 32:
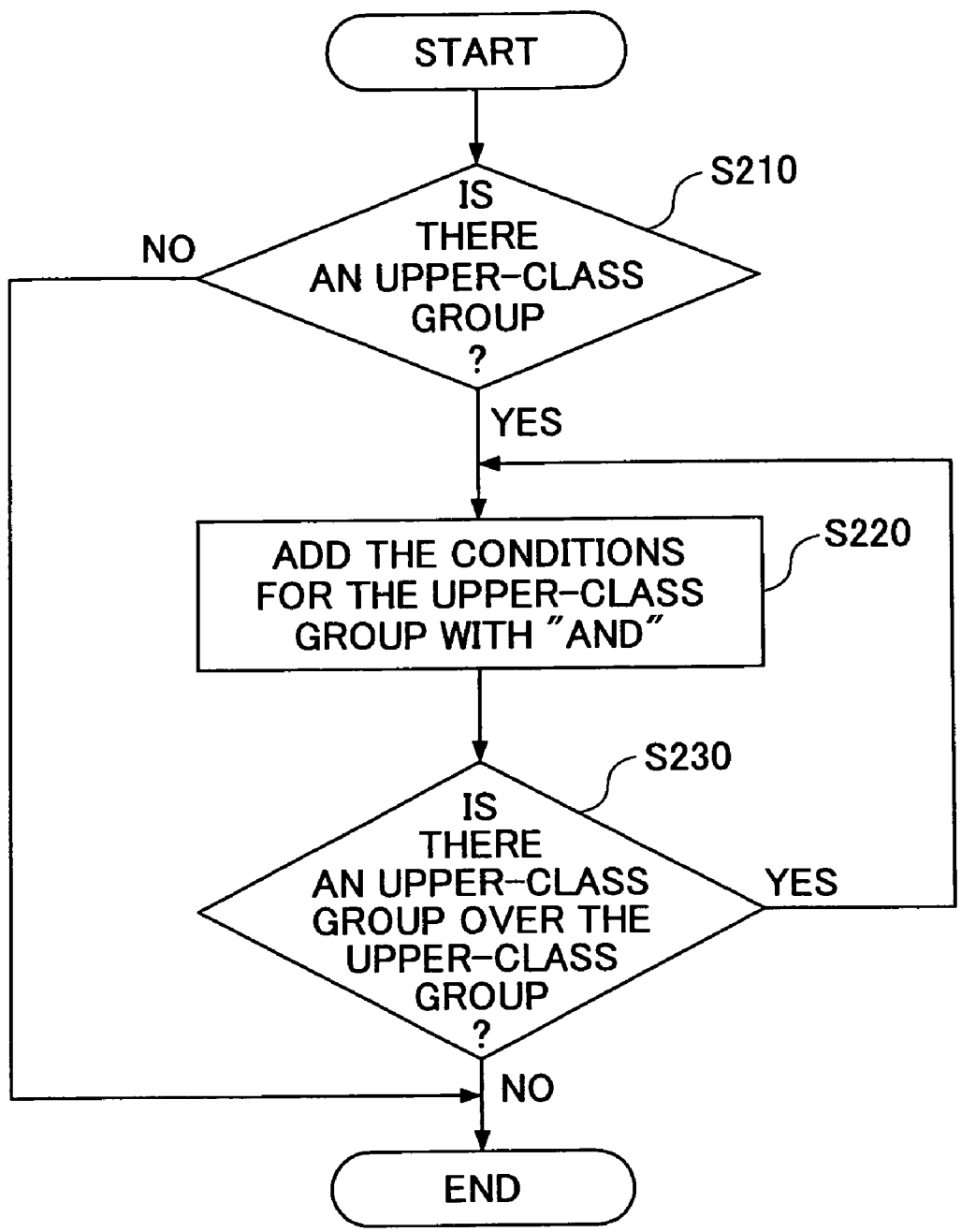
FIG. 32 is a flowchart of a condition generating operation.

In the combination machine 101, the UCS 168 performs a "condition generating operation" to generate the conditions for specifying a group based on the XML data. FIG. 32 is a flowchart of the condition generating operation. First, if there is an upper-class group over the group for which conditions are to be generated (S210), the conditions for the upper-class group are added with "AND" to the conditions for the group for which conditions are to be generated (S220). Further, if there is an upper-class group over the upper-class group ("YES" in S230), the conditions for the upper-class group are added with "AND" to the conditions for the group for which conditions are to be generated (S220). The above procedures are repeated until there is not an upper-class group at all. If there is only one upper-class group from the same class, the conditions for the upper-class group are added with "AND". If there are two or more upper-class groups from the same class, "OR" of the conditions for those upper-class groups are added with "AND". In this manner, the conditions for the upper-class group are not added with "AND" to the group for which conditions are to be generated, but the conditions for a lower-class group may be added with "OR" to the conditions for the group for which conditions are to be generated.

Figure 33:
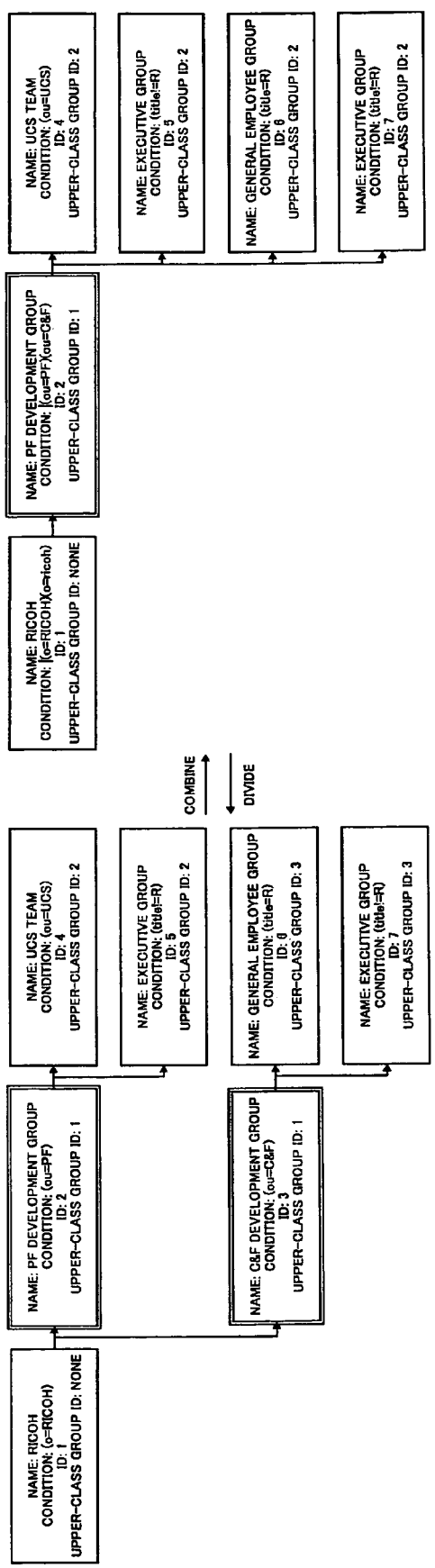
FIG. 33 illustrates a combining operation and a dividing operation.

FIG. 33 illustrates an operation of combining two or more groups into one group, and an operation of dividing one group into two or more groups. On the group setting screen 803 of FIG. 25, for example, groups can be combined by dragging the group icons. FIG. 33 shows the operation of combining the group "PF development group" with the group "C&F development group", seen from the side of group information. The conditions for the group "PF development group" are "ou=PF" before the combining, but are "|(ou=PF)(ou=C&F)" after the combining, taking in the group conditions for the group "C&F development group". As shown in FIG. 33, the operation that is reverse to the combining operation is the dividing operation.

Through the setting operation illustrated in FIG. 18, the conditions for causing the LDAP servers 401 to authorize a user to use the combination machine 101 are set in the combination machine 101. Through the setting operation illustrated in FIG. 19, the conditions for allowing the use of the facsimile function of the combination machine 101 are set in the combination machine 101 by each "PF development group". Through the setting operation illustrated in FIG. 20, the "PF development group" that is determined by whether the user information of a user managed by the LDAP server 701 with respect to whether the user belongs to the "PF development group" satisfies the condition of "ou=PF" is set in the combination machine 101.

Figure 34:
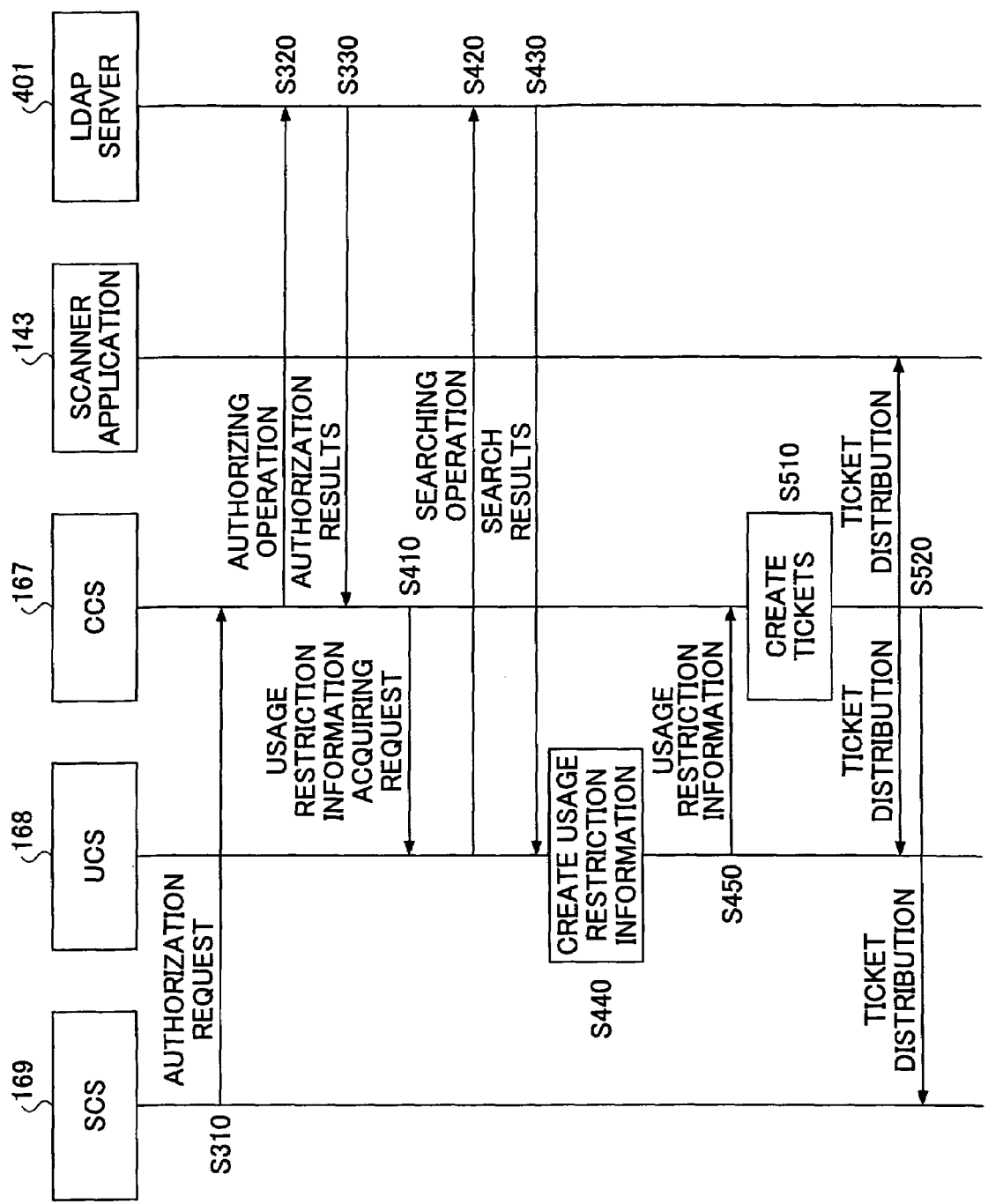
FIG. 34 is a sequence diagram of the authorizing operation and the usage restricting operation.

FIG. 34 is a sequence diagram of the user authorizing operation and the usage restricting operation with respect to the combination machine 101. When a user inputs authorization information in the combination machine 101 so as to log in with the combination machine 101, an authorization request is transmitted from the SCS 169 to the CCS 167 (S310). In response to this request, the CCS 167 requests the LDAP servers 401 for an authorizing operation (S320). In response to this request, the LDAP servers 401 supply the authorization results to the CCS 167 (S330). A usage restriction information acquiring request is then transmitted from the CCS 167 to the UCS 168 (S410). In response to this request, the UCS 168 requests the LDAP servers 401 to search for the user information of the user (S420). In response to that, the LDAP servers 401 supply the user information search results to the UCS 168 (S430). Upon receipt of the search results, the UCS 168 creates "usage restriction information" as to whether the user is allowed to use the respective functions of the combination machine 101 (S440). The UCS 168 then supplies the usage restriction information to the CCS 167 (S450). The CCS 167 in turn creates tickets for the respective functions of the combination machine 101 (S510) and distributes them (S520).

Figure 35:
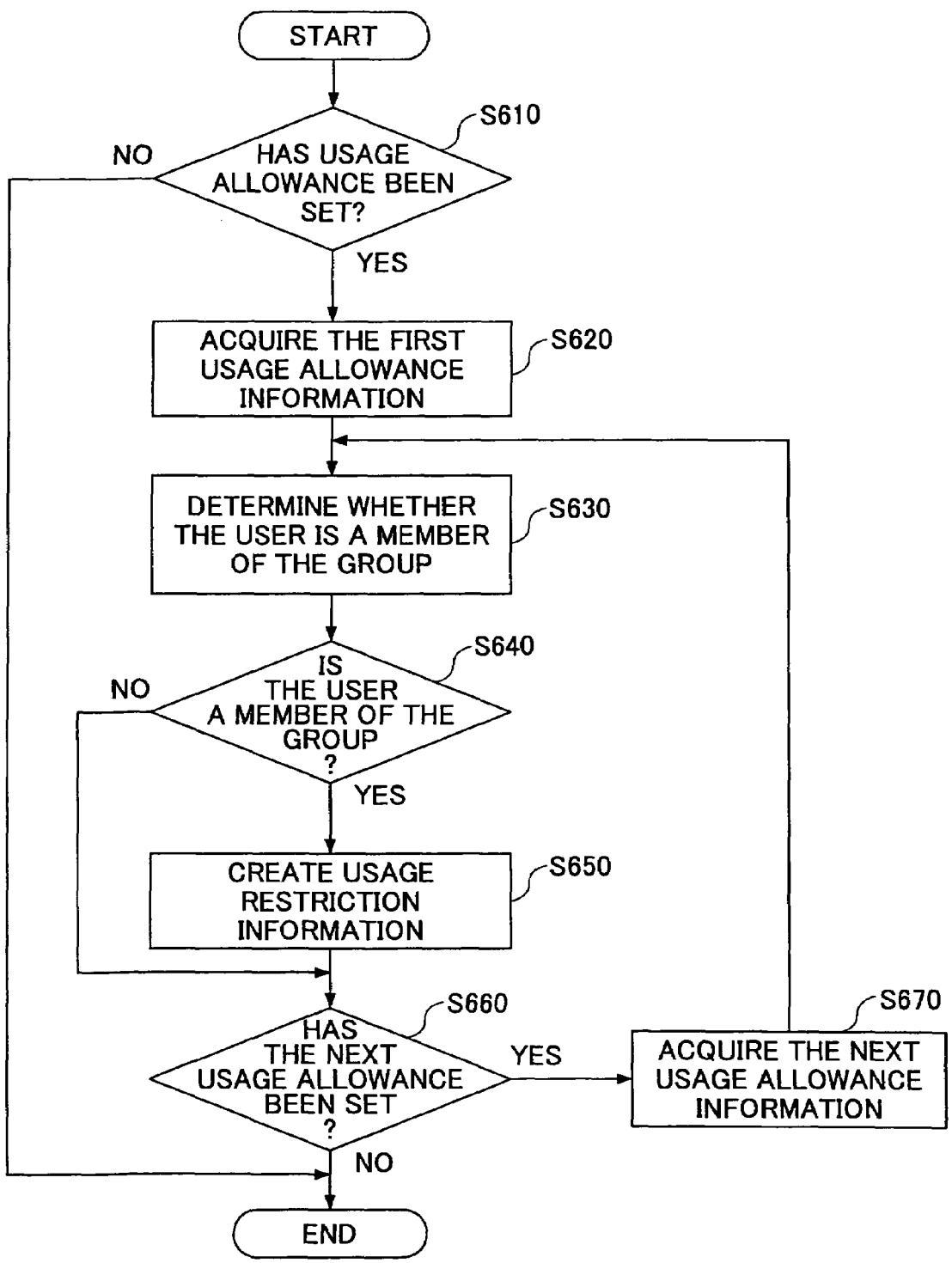
FIG. 35 is a flowchart of the operation of creating usage restriction information.

FIG. 35 is a flowchart of the operation of creating the usage restriction information (S440). In the combination machine 101, the conditions for giving usage allowance with respect to the respective functions of the combination machine 101 are set for each "group". If usage is allowed ("YES" in S610), the UCS 168 first acquires the setting information of the first usage allowance (S620), and determines whether the user is a member of the group to which the first usage allowance is given (S630). If the user is a member of the group to which the first usage allowance is given ("YES" in S640), the UCS 168 creates usage restriction information from the setting information of the first usage allowance (S650). If there is the next usage allowance to be set ("YES" in S660), the UCS 168 acquires the setting information of the next usage allowance (S670). The above procedures are repeated.

Figure 36:
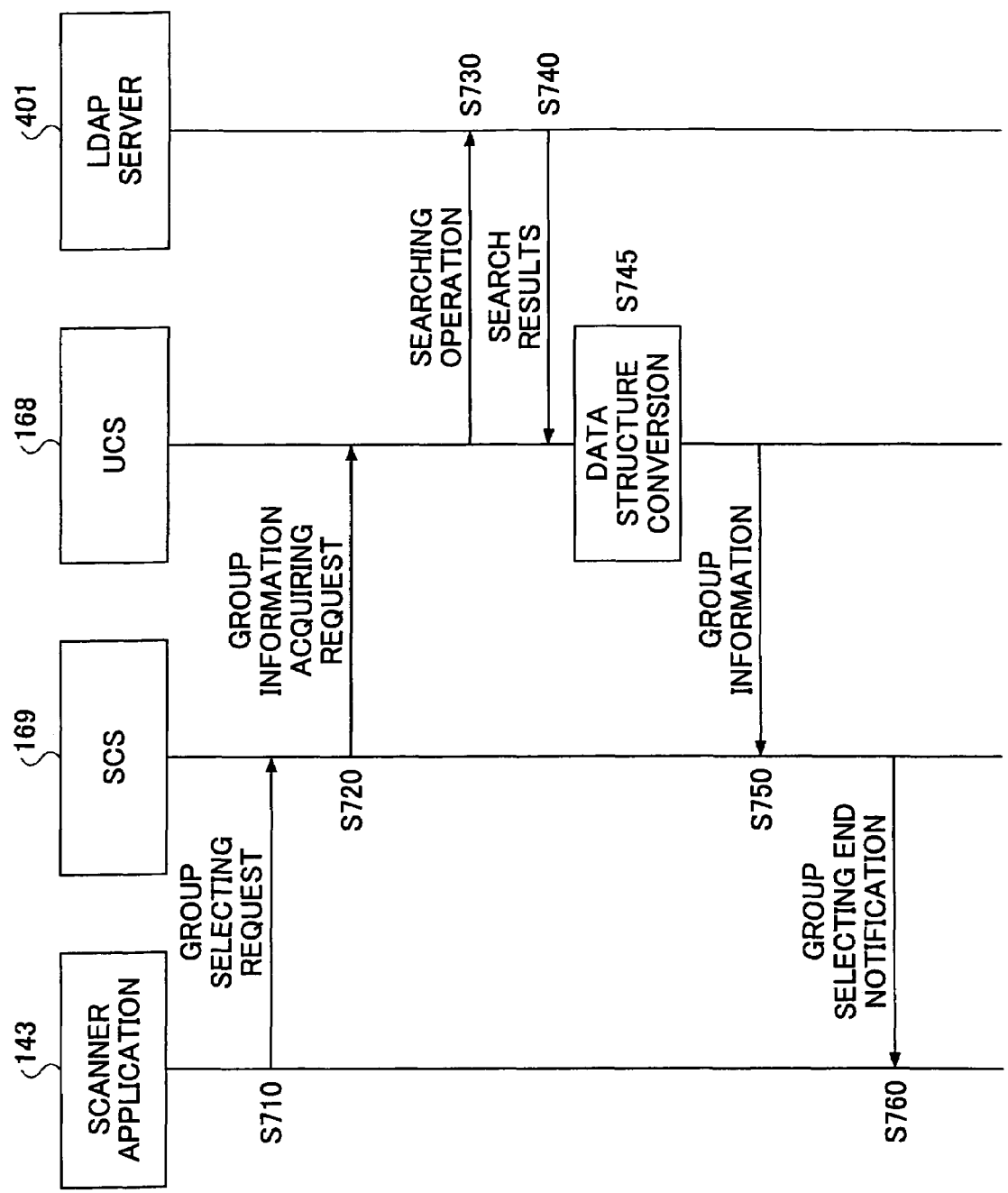
FIG. 36 is a sequence diagram of the operation using the groups as addresses.

The groups that are set in the combination machine 101 are not only used in the user authorizing operation and usage restricting operation with respect to the combination machine 101, but also may be used as the "addresses" such as mail addresses and FAX numbers. FIG. 36 is a sequence diagram of the operation using the groups that are set in the combination machine 101 as the "addresses". When a group that is set in the combination machine 101 is selected as an address, a group selecting request is transmitted from the scanner application 143 or the like to the SCS 169 (S710). In response to this, the SCS 169 transmits a group information acquiring request to the UCS 168 (S720). In response to this, the UCS 168 requests the LDAP servers 401 to search for the user information of a user that belongs to the subject group (S730). In response to this request, the LDAP servers 401 supply the search results to the UCS 168 (S740). Upon receipt of the search results, the UCS 168 supplies the group information to the SCS 169 (S750). Upon receipt of the group information, the SCS 169 transmits a group selection end notification to the scanner application 143 or the like (S760). The data structure of the user information searched by the LDAP servers 401 is converted (S745) between the procedure of S740 and the procedure of S750, as in the operation illustrated in FIG. 8.

Lastly, the respective roles of the combination machine 101 and the PC 701 are described. The "setting screens" of FIGS. 18 through 23 and the "setting screens" of FIGS. 25 through 29 are provided on the screen of the PC 701 through the combination machine terminal application 732. However, the "setting screens" of FIGS. 18 through 23 may be provided on the screen of the combination machine 101 through the SCS 169. In other words, the group setting may be performed in the PC 701, while the authorization setting and the usage restriction setting are performed in the combination machine 101. The setting operations may be performed at the same time both in the PC 701 and the combination machine 101.

The PC 701 of FIG. 13 is equivalent to the "terminal device" of the present invention, and the information processing operation performed by the PC 701 of FIG. 13 is equivalent to the "information processing method" of the present invention. The combination machine terminal application 732 is equivalent to the "information processing program" of the present invention. The CD-ROM on which the combination machine terminal application 732 of FIG. 15 is recorded is equivalent to the "recording medium" of the present invention. The combination machine 101 of FIG. 1 is equivalent to the "information processing apparatus" of the present invention.

It should be noted that the present invention is not limited to the embodiments specifically disclosed above, but other variations and modifications may be made without departing from the scope of the present invention.

This patent application is based on Japanese Priority Patent Application No. 2004-074960, filed on Mar. 16, 2004, the entire contents of which are hereby incorporated by reference.

What is claimed is:

1. A terminal device that serves as a terminal of an information processing apparatus, the information processing apparatus being a client of an external user information managing server that manages user information in the form of item values corresponding to user information management items, the terminal device comprising:
    a group setting screen providing unit that provides a group setting screen configured to enable the formation of a group in the information processing apparatus by providing an input which enables a predetermined item value, corresponding to a predetermined user information management item stored in the external user information managing server, to be set,
    the group being formed by including each user that has user information stored in the external user information managing server and corresponding to the user that matches the predetermined item value set via the input, the user information managing server managing whether the user belongs to the group,
    the group setting screen providing unit further configured to enable an attribute for use in the group formation to be entered into the group setting screen, the group being formed based on the entered attribute, the group setting screen configured to enable the formation of a group set of multiple layered groups wherein an operation and a function allowed for a user belonging to an upper user group are inherited to a lower user group associated with the upper group.

2. The terminal device as claimed in claim 1, further comprising:
    an authorization setting screen providing unit that provides an authorization setting screen configured to enable the setting of conditions for causing the user information managing server to authorize a user to use the information processing apparatus, the conditions being set in the information processing apparatus.

3. The terminal device as claimed in claim 1, further comprising:
    a usage restriction setting screen providing unit that provides a usage restriction setting screen configured to enable the setting of conditions for putting usage restrictions on users to use the information processing apparatus for each group, the conditions being set in the information processing apparatus.

4. The terminal device as claimed in claim 1, wherein the group setting screen providing unit provides the group setting screen as to set the conditions through a character input operation.

5. The terminal device as claimed in claim 1, wherein the group setting screen providing unit provides the group setting screen as to set the conditions through a user information management item selecting operation and an item value selecting operation.

6. The terminal device as claimed in claim 1, wherein the group setting screen providing unit provides the group setting screen as to set the conditions through a user information management item selecting operation, an item value selecting operation, and an "AND, OR, NOT" selecting operation.

7. The terminal device as claimed in claim 1, wherein the group setting screen providing unit provides the group setting screen as to set the group by handling an icon that represents the group.

8. The terminal device as claimed in claim 1, wherein a combining operation is performed to combine a plurality of groups into one group on the group setting screen or the usage restriction setting screen.

9. The terminal device as claimed in claim 8, wherein a dividing operation is performed to divide one group into a plurality of groups on the group setting screen or the usage restriction setting screen.

10. The terminal device as claimed in claim 1, wherein a referring operation is performed to refer to a user who belongs to a group on the group setting screen or the usage restriction setting screen.

11. The terminal device as claimed in claim 1, wherein a copying operation is performed to copy a group on the group setting screen or the usage restriction setting screen.

12. The terminal device as claimed in claim 1, wherein a deleting operation is performed to delete a group on the group setting screen or the usage restriction setting screen.

13. The terminal device as claimed in claim 1, wherein the group is written in XML and is set by SOAP in the information processing apparatus.

14. The terminal device as claimed in claim 1, wherein the user information managing server is a LDAP server.

15. The terminal device as claimed in claim 1, wherein the information processing apparatus is an image forming apparatus.

16. An information processing method utilized by a terminal device serving as a terminal of an information processing apparatus, the information processing apparatus being a client of a user information managing server that manages user information using item values corresponding to user information management items, the information processing method comprising:

providing a group setting screen to enable the formation of a group in the information processing apparatus by providing an input which enables a predetermined item value, corresponding to a predetermined user information management item stored in the external user information managing server, to be set, the group being formed by including each user that has user information stored in the external user information managing server and corresponding to the user that matches the predetermined item value set via the input, the user information managing server managing whether the user belongs to the group, the group setting screen further enabling an attribute for use in the group formation to be entered into the group setting screen, the group being formed based on the entered attribute and further enabling the formation of a group set of multiple layered groups wherein an operation and a function allowed for a user belonging to an upper user group are inherited to a lower user group associated with the upper group.

17. The information processing method as claimed in claim 16, further comprising:

providing an authorization setting screen to enable the setting of conditions for causing the user information managing server to authorize a user to use the information processing apparatus, the conditions being set in the information processing apparatus.

18. The information processing method as claimed in claim 16, further comprising:

providing a usage restriction setting screen to enable the setting of conditions for putting usage restrictions on users to use the information processing apparatus for each group, the conditions being set in the information processing apparatus.

19. A computer readable medium including computer executable instructions, wherein the instructions, when executed by a processor, cause the processor to perform an information processing method utilized by a terminal device serving as a terminal of an information processing apparatus, the information processing apparatus being a client of a user information managing server that manages user information using item values corresponding to user information management items, the information processing method comprising:

providing a group setting screen to enable the formation of a group in the information processing apparatus by providing an input which enables a predetermined item value, corresponding to a predetermined user information management item stored in the external user information managing server, to be set, the group being formed by including each user that has user information stored in the external user information managing server and corresponding to the user that matches the predetermined item value set via the input, the user information managing server managing whether the user belongs to the group, the group setting screen further enabling an attribute for use in the group formation to be entered into the group setting screen, the group being formed based on the entered attribute and further enabling the formation of a group set of multiple layered groups wherein an operation and a function allowed for a user belonging to an upper user group are inherited to a lower user group associated with the upper group.

20. An information processing apparatus, the information processing apparatus being a client of an external user information managing server that manages user information in the form of item values corresponding to user information management items, the information processing comprising:

a group being formed in the information processing apparatus by a terminal of the information processing apparatus that includes an input which enables a predetermined item value corresponding to a predetermined user information management item stored in the external user information managing server, to be set, the group being formed by including each user that has user information stored in the external user information managing server and corresponding to the user that matches the predetermined item value set via the input, the user information managing server managing whether the user belongs to the group, the terminal including a group setting screen enabling an attribute for use in the group formation to be entered into the input, the group being formed based on the entered attribute and further enabling the formation of a group set of multiple layered groups wherein an operation and a function allowed for a user belonging to an upper user group are inherited to a lower user group associated with the upper group.

21. The information processing apparatus as claimed in claim 20, wherein conditions for causing the user information managing server to authorize a user to use the information processing apparatus are set in the information processing apparatus by the terminal of the information processing apparatus.

22. The information processing apparatus as claimed in claim 20, wherein conditions for putting usage restrictions on users to use the information processing apparatus for each group are set in the information processing apparatus by the terminal of the information processing apparatus.

* * * * *